United States Patent
Anaokar et al.

(10) Patent No.: US 11,943,189 B2
(45) Date of Patent: Mar. 26, 2024

(54) SYSTEM AND METHOD FOR CREATING AN INTELLIGENT MEMORY AND PROVIDING CONTEXTUAL INTELLIGENT RECOMMENDATIONS

(71) Applicant: Imemori Technologies Private Limited, Karnataka (IN)

(72) Inventors: Malhar Anaokar, Karnataka (IN); Akshat Prasad, Karnataka (IN)

(73) Assignee: Imemori Technologies Private Limited (IN)

( * ) Notice: Subject to any disclaimer, the term of this patent is extended or adjusted under 35 U.S.C. 154(b) by 13 days.

(21) Appl. No.: 17/615,720

(22) PCT Filed: Nov. 30, 2021

(86) PCT No.: PCT/IN2021/051125
§ 371 (c)(1),
(2) Date: Dec. 1, 2021

(87) PCT Pub. No.: WO2023/017528
PCT Pub. Date: Feb. 16, 2023

(65) Prior Publication Data
US 2023/0052123 A1    Feb. 16, 2023

(30) Foreign Application Priority Data
Aug. 12, 2021 (IN) .............................. 202141036621

(51) Int. Cl.
*G06F 16/00* (2019.01)
*G06F 16/33* (2019.01)
(Continued)

(52) U.S. Cl.
CPC ........ *H04L 51/216* (2022.05); *G06F 16/3329* (2019.01); *G06F 16/3334* (2019.01); *G06F 16/358* (2019.01)

(58) Field of Classification Search
CPC .............. G06F 16/358; G06F 16/3334; G06F 16/3329; H04L 51/216
(Continued)

(56) References Cited

U.S. PATENT DOCUMENTS 7,809,659 B1 * 10/2010 Paiz .................... G06F 16/954
706/45
8,677,083 B1 * 3/2014 McHugh ............. G06F 21/6209
711/100
(Continued)

FOREIGN PATENT DOCUMENTS

CN    106445974 A    2/2017

OTHER PUBLICATIONS

International Search Report for Application No. PCT/IN2021/051125 dated Mar. 2, 2022, pp. 1-2.

Primary Examiner — Monica M Pyo
(74) Attorney, Agent, or Firm — Lerner David LLP

(57) ABSTRACT

A system and a method creating an intelligent memory and providing contextual intelligent recommendations is provided. The invention provides extracting electronic communications data associated with active user data. Further, the invention provides performing a keyword tagging operation on conversation data present in the extracted electronic communications data based on a pre-generated keywords map. The invention provides generating a multi-relational model representative of conversation data associated with the electronic communications data in the form of graph nodes based on the keywords stored as the first tag and the second tag. The invention provides transmitting one or more electronic Recommendation Action Communication (RAC) with embedded application program interface calls based on the multi-relational model, the embedded application pro-
(Continued)

gram interface calls enabling actions to be taken on information units via a single click.

22 Claims, 25 Drawing Sheets

(51) Int. Cl.
*G06F 16/332* (2019.01)
*G06F 16/35* (2019.01)
*H04L 51/216* (2022.01)

(58) Field of Classification Search
USPC .......................................................... 707/736
See application file for complete search history.

(56) References Cited

U.S. PATENT DOCUMENTS

| | | | |
|---|---|---|---|
| 8,943,279 B1* | 1/2015 | McHugh | G06F 11/1435 711/100 |
| 10,607,165 B2* | 3/2020 | Punera | G06Q 10/063114 |
| 2005/0132012 A1* | 6/2005 | Muller | H04L 51/066 709/206 |
| 2006/0026252 A1* | 2/2006 | Caspi | H04L 12/1827 709/207 |
| 2011/0161445 A1* | 6/2011 | Nelke | H04L 51/04 709/206 |
| 2013/0198004 A1* | 8/2013 | Bradley | G06Q 30/0269 705/14.64 |
| 2015/0026260 A1* | 1/2015 | Worthley | G06F 16/958 709/204 |
| 2015/0134389 A1* | 5/2015 | Punera | G06N 5/00 705/7.15 |
| 2018/0123997 A1* | 5/2018 | Celedonia | H04L 67/306 |
| 2018/0181806 A1* | 6/2018 | Chandrashekar | H04W 4/021 |
| 2020/0351227 A1 | 11/2020 | Smullen et al. | |
| 2021/0192412 A1* | 6/2021 | Krishnaswamy | G06Q 30/0201 |
| 2021/0241162 A1* | 8/2021 | Asadorian | G06N 5/04 |
| 2021/0294829 A1* | 9/2021 | Bender | G06F 16/3347 |

\* cited by examiner

SYSTEM AND METHOD FOR CREATING AN INTELLIGENT MEMORY AND PROVIDING CONTEXTUAL INTELLIGENT RECOMMENDATIONS

FIELD OF THE INVENTION

The present invention relates generally to the field of data processing and data analytics, and more particularly, to a system and a method for creating an intelligent memory and providing contextual intelligent recommendations.

BACKGROUND OF THE INVENTION

Electronic communications pertain to data exchange via various modes such as e-mails, chat messengers, instant messaging, Short Message Service (SMS), text messaging and voice mails. Organizations employ various data analytics systems for maintaining data exchanged during electronic communications for processing, analytics, storage and future use. Typically, electronic communications comprise informal phrases, expressions and lingo and it has been observed that existing data analytics systems are not able to analyze such communications efficiently in the absence of dictionary definitions, more so, as electronic communications in different organizations may include domain and organization specific meanings and jargons.

Further, existing systems do not provide for transferring of conversation threads associated with the electronic communications to users who were not originally involved in the conversation and is therefore not accessible to authorized users. For example, traditional email systems link conversation threads with employees and not to the role they perform and, in a scenario of reassignment or employees leaving the organization, relevant conversation history is lost or remains untapped. Also, existing systems are not able to parse electronic communications data for continuous long-term analysis and for providing long-term as well as contextual intelligent recommendations.

Furthermore, it has been observed that existing systems are not able to measure time and accuracy of updates to critical enterprise information systems in the organization. Yet further, existing systems do not provide automated insights on collaboration opportunities across the organization through identifying similar work or assignment done by other users in the organization. It has also been observed that existing systems do not provide for adequate navigation and linkages between conversation data associated with electronic communications for a user once the user is no longer with the organization. Further, storage of conversation data associated with electronic communications by existing systems create storage space issues and duplication of stored data, thereby wasting storage space and leading to cumbersome search operations.

Also, various limitations have been observed in existing systems with respect to purging of conversation data associated with electronic communications due to legal and ownership constrains, which leads to data loss in archives. Furthermore, existing systems are not able to determine correlations between similar actionable intelligent data associated with electronic communications, as data is scattered and stored in various storage locations. Yet further, existing systems are not able to determine and track changes made to any document shared along with conversation data associated with electronic communications (e.g. attached documents in an email) to provide document revision history for the electronic communication thread.

In light of the aforementioned drawbacks, there is a need for a system and a method that provides for creating an intelligent memory and providing contextual intelligent recommendations. There is a need for a system and a method which provides for parsing of electronic communications data for continuous long-term analysis and for providing intelligent recommendations. Further, there is a need for a system and a method which provides for inheriting past electronic communications data. Yet further, there is a need for a system and a method which provides for adequate navigation and linkages between conversation data associated with electronic communications. Furthermore, there is a need for a system and a method which provides for appropriately determining correlations between similar actionable intelligent data associated with electronic communications.

SUMMARY OF THE INVENTION

In various embodiments of the present invention, a system for creating an intelligent memory and providing contextual intelligent recommendations is provided. The system comprises a memory storing program instructions, a processor executing instructions stored in the memory and an intelligent memory generation engine executed by the processor. The intelligent memory generation engine is configured to extract electronic communications data associated with active user data. Further, the intelligent memory generation engine is configured to perform a keyword tagging operation on conversation data present in the extracted electronic communications data based on a pre-generated keywords map. The keywords corresponding to an entity associated with the electronic communications data are stored as a first tag in a record storage unit. The keywords corresponding to the extracted electronic communications data are stored as a second tag in the record storage unit. Further, the intelligent memory generation engine is configured to generate a multi-relational model representative of conversation data associated with the electronic communications data in the form of graph nodes based on the keywords stored as the first tag and the second tag. The multi-relational model comprises node embeddings which are computed for unseen nodes that represent unseen relationships between the electronic communications data and other data stored in a sub-record storage unit of the record storage unit. Lastly, the intelligent memory generation engine is configured to transmit one or more electronic Recommendation Action Communication (RAC) with embedded application program interface calls based on the multi-relational model, the embedded application program interface calls enabling actions to be taken on information units (132) via a single click.

In various embodiment of the present invention, a method for creating an intelligent memory and providing contextual intelligent recommendations is provided. The method is carried out by a processor executing program instructions stored in a memory. The method comprises extracting electronic communications data associated with active user data. Further, the method comprises performing a keyword tagging operation on conversation data present in the extracted electronic communications data based on a pre-generated keywords map. The keywords corresponding to an entity associated with the electronic communications data are stored as a first tag in a record storage unit. The keywords corresponding to the extracted electronic communications data are stored as a second tag in the record storage unit. Further, the method comprises generating a multi-relational model representative of conversation data associated with the electronic communications data in the form of graph nodes based on the keywords stored as the first tag and the second tag. The multi-relational model comprises node embeddings which are computed for unseen nodes that represent unseen relationships between the electronic communications data and other data stored in a sub-record storage unit of the record storage unit. Lastly, the method comprises transmitting one or more electronic Recommendation Action Communication (RAC) with embedded application program interface calls based on the multi-relational model, the embedded application program interface calls enabling actions to be taken on information units via a single click.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
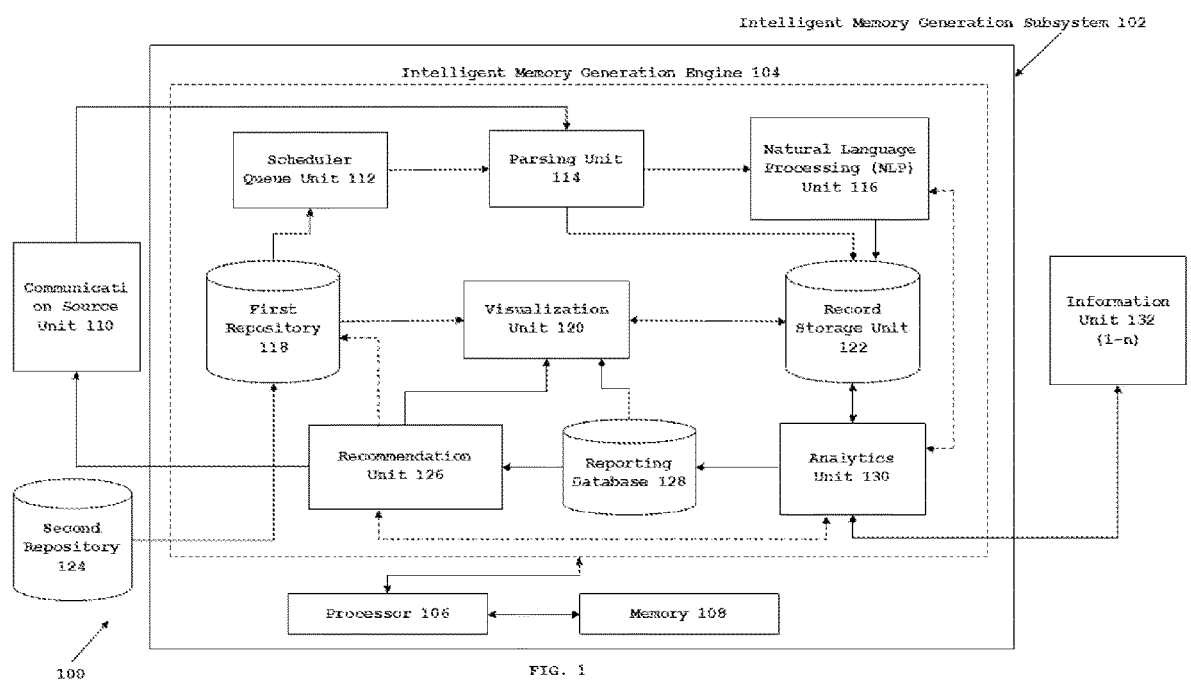
FIG. 1 is a detailed block diagram of a system for creating an intelligent memory and providing contextual intelligent recommendations, in accordance with an embodiment of the present invention.

FIG. 1 is a detailed block diagram of a system 100 for creating an intelligent memory and providing contextual intelligent recommendations, in accordance with an embodiment of the present invention. Referring to FIG. 1, the system 100 comprises a communication source unit 110, an intelligent memory generation subsystem 102, a second repository 124 and one or more information units (1-n) 132. The communication source unit 110, the second repository 124 and the information unit 132 are connected to the intelligent memory generation subsystem 102 via a communication channel (not shown). The communication channel (not shown) may include, but is not limited to, a physical transmission medium, such as, a wire, or a logical connection over a multiplexed medium, such as, a radio channel in telecommunications and computer networking. Examples of radio channel in telecommunications and computer networking may include, but are not limited to, a local area network (LAN), a metropolitan area network (MAN) and a wide area network (WAN).

In an embodiment of the present invention, the system 100 is a self-optimization system configured to employ one or more cognitive techniques for extracting and processing data associated with electronic communications. In an exemplary embodiment of the present invention, the cognitive techniques may include, but are not limited to, artificial intelligence techniques and machine learning techniques. The system 100 provides an optimized interlinking of conversations data in electronic communications for creating an intelligent memory and providing contextual intelligent recommendations. In an exemplary embodiment of the present invention, the intelligent memory is representative of an institutional memory comprising one or more data types associated with a group of people in an organization. The one or more data types correspond to facts, concepts, experiences and knowledge associated with the group of people which are collected, processed and enhanced to provide inheritance of electronic communications data, contextual recommendations and insights. The system 100 is configured to determine intelligence from data associated with electronic communications. For example, the system 100 may process and extract electronic communications data present in an email mailbox of an employee of an organization for determining intelligence associated with such data.

In an embodiment of the present invention, the subsystem 102 comprises an intelligent memory generation engine 104 (the engine 104), a processor 106 and a memory 108. The engine 104 includes various units, which operate in conjunction with each other for generating intelligent memory and providing contextual intelligent recommendations. The various units of the engine 104 are operated via the processor 106 specifically programmed to execute instructions stored in the memory 108 for executing respective functionality of the units of the engine 104, in accordance with various embodiments of the present invention.

In an embodiment of the present invention, the subsystem 102 may be implemented in a cloud computing architecture in which data, applications, services, and other resources are stored and delivered through shared data-centers. In an exemplary embodiment of the present invention, the functionalities of the subsystem 102 are delivered to a user as Software as a Service (SaaS) or Platform as a Service (Paas) over a communication network.

In another embodiment of the present invention, the subsystem 102 may be implemented as a client-server architecture. In this embodiment of the present invention, a client terminal accesses a server hosting the subsystem 102 over a communication network. The client terminals may include but are not limited to a smart phone, a computer, a tablet, a Graphical User Interface (GUI), an Application Programming Interface (API), microcomputer or any other wired or wireless terminal. The server may be a centralized or a decentralized server.

In an embodiment of the present invention, the engine 104 comprises a scheduler queue unit 112, a parsing unit 114, a Natural Language Processing (NLP) unit 116, a first repository 118, a visualization unit 120, a record storage unit 122, a recommendation unit 126, a reporting database 128 and an analytics unit 130.

Figure 2:
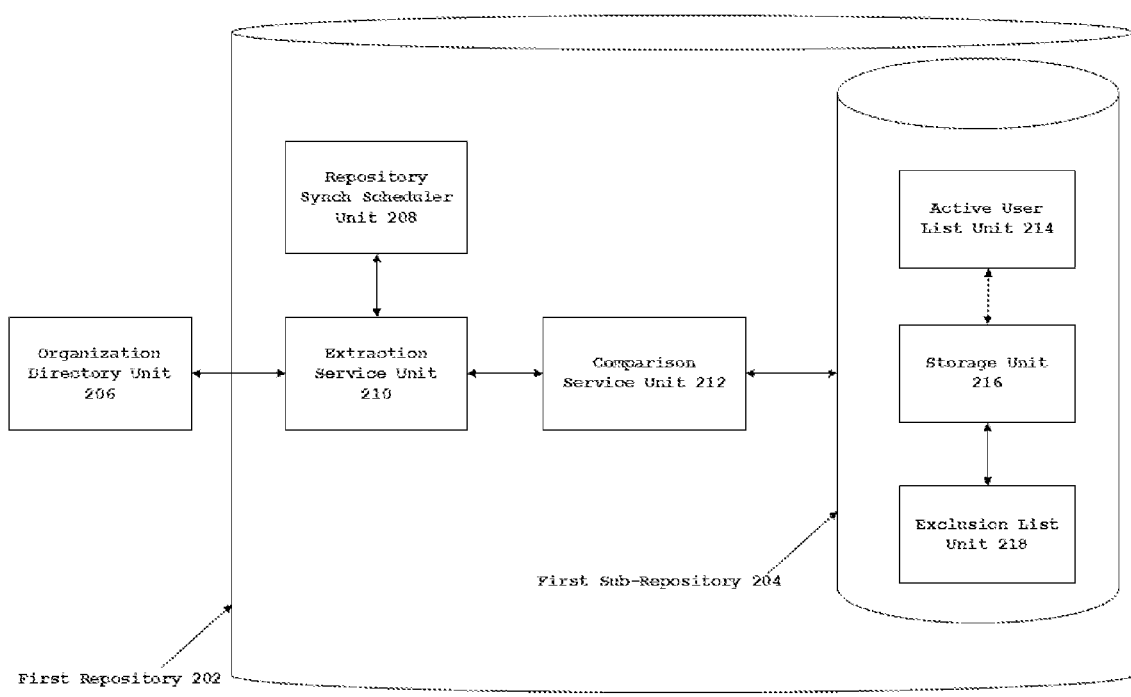
FIG. 2 illustrates a detailed block diagram of a repository, in accordance with an embodiment of the present invention.

In an embodiment of the present invention, the first repository 118 comprises data associated with at least one or more past users, who are no longer associated with the organization and one or more present users. FIG. 2 illustrates a detailed block diagram of the first repository 202 (118, FIG. 1). The first repository 202 comprises a first sub-repository 204, a repository synchronization (synch) scheduler unit 208, an extraction service unit 210, a comparison service unit 212. Further, the first sub-repository 204 comprises an active user list unit 214, a storage unit 216 and an exclusion list unit 218.

In an exemplary embodiment of the present invention, the first repository 202 is configured to operate on at least one of, but is not limited to, a Not Only Structured Query Language (NoSQL) design, a Lightweight Directory Access Protocol (LDAP) or a Graph database. In an embodiment of the present invention, the extraction service unit 210 of the first repository 202 is connected to an organization directory unit 206 (i.e. the second repository 124, FIG. 1). The organization directory unit 206 is associated with user data in an organization and is updated based on current user data as well as data associated with users joining and leaving the organization. In an embodiment of the present invention, the extraction service unit 210 connects and synchronizes (synch) with the organization directory unit 206 at predetermined intervals for determining any changes in the user data and subsequently extracting the user data for extracting the electronic communications data associated with the user data. The repository synch scheduler unit 208 is configured to communicate with the extraction service unit 210 for controlling and scheduling the user data extraction from the organization directory unit 206.

In an embodiment of the present invention, the repository synch scheduler unit 208 is configured to set a time window for extraction of a count data associated with the user data from the organization directory unit 206 in a pre-defined time-period and frequency. Further, the count data present in the organization directory unit 206 is determined based on, at least, users (i.e. the employees, contractors, etc.) that have left the organization, present users in the organization, or new users that have joined the organization on a previous day. Further, based on the count data, users which are determined as missing since a previous sync are flagged as 'Not Active' (NA) by the extraction service unit 210. Extraction of data corresponding to such users are not carried out from that day onwards. Existing or new users are flagged as 'active' by the extraction service unit 210.

In an embodiment of the present invention, the extracted user data from the extraction service unit 210 is transmitted to the comparison service unit 212 for comparing changes in user data since a last synch. In an embodiment of the present invention, the extraction service unit 210 receives user data from the organization directory unit 206 with all data fields. The comparison service unit 212 makes a differential comparison of each relevant field (i.e. fields mentioned in Table 1) for determining changes. In the event a change is determined in a data field from the information received from the organization directory unit 206 as compared to a corresponding data field in the storage unit 216 (for e.g. change in manager, geo location, designation, etc.), then the comparison service unit 212 modifies that data field in the storage unit 216 to ensure consistency between the user data present in the storage unit 216 and the user data present in the organization directory unit 206.

Figure 6:
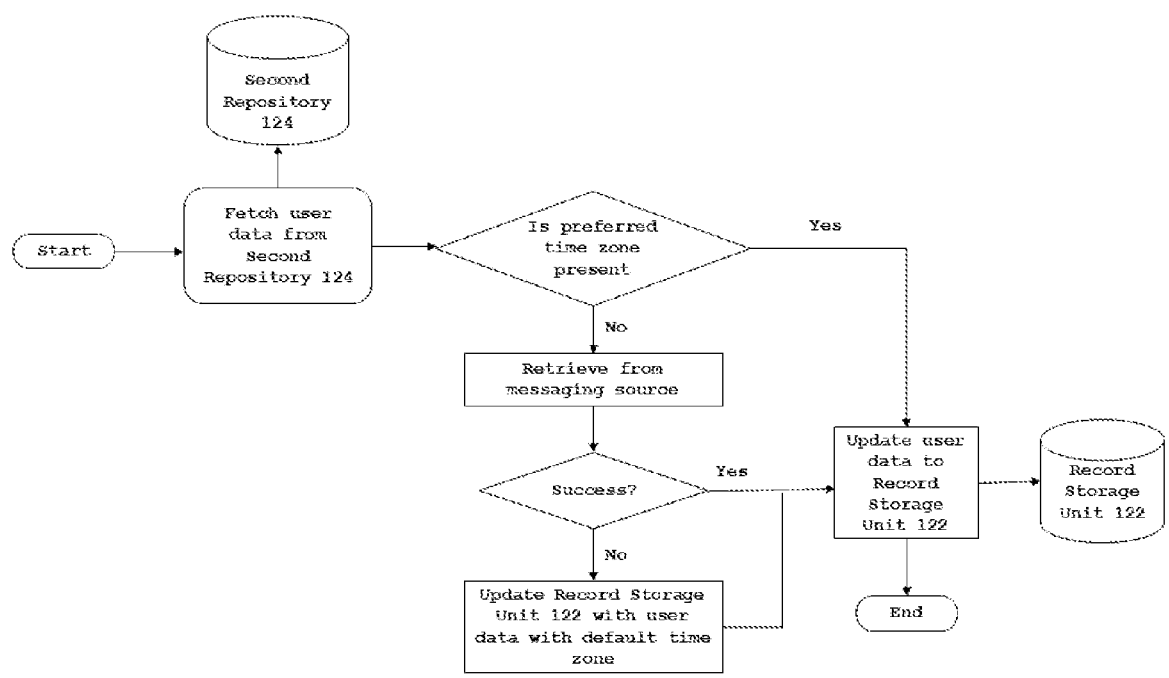
FIG. 6 is a flowchart illustrating setting of time zone for each user in a user list unit, in accordance with an embodiment of the present invention.

In an embodiment of the present invention, based on an extracted list of active users, a synch mechanism of the repository synch scheduler unit 208 configured within the first repository 118 sets the appropriate time zone for each user. FIG. 6 is a flowchart illustrating the setting of time zone for each user in the active user list unit 214 (FIG. 2) of the first repository 202 (FIG. 2). As illustrated in FIG. 6, the repository synch scheduler unit 208 performs the extraction at predetermined time intervals. This aids in updating the time zone data associated with the user data stored in the first repository 202. Further, if the user has not updated his/her preferred time zone, then the repository synch scheduler unit 208 uses a messaging source time zone settings as the preferred time zone for that user.

Figure 3:
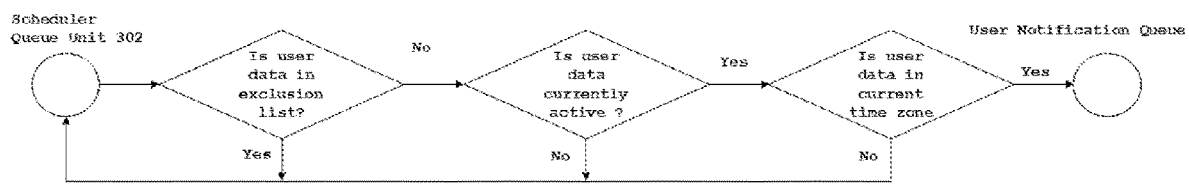
FIG. 3 illustrates a flowchart depicting data selection from a repository, in accordance with an embodiment of the present invention.

In an embodiment of the present invention, the extraction service unit 210 is further configured to extract geographical location of each user associated with the electronic communications data. The extraction of geographical location aids in scheduling extraction by the scheduler queue unit 112 for a particular user's communications data only when a previous calendar day is over in that geography for that particular user. An extraction process flow carried out by the scheduler queue unit 112, 302 for user data selection is illustrated in FIG. 3. FIG. 3 depicts user data selection by the scheduler queue unit 112, 302 from the first repository 202.

In an exemplary embodiment of the present invention, the extraction service unit 210 is configured to assemble the extracted user data in a format as illustrated in Table 1:

TABLE 1

| User ID | User Name | User email | Manager Name | Manager email | Location | Last Extraction Date | Last Extraction Month | View Rights to: | Active? |
|---------|-----------|------------|--------------|---------------|----------|----------------------|-----------------------|-----------------|---------|
|         |           |            |              |               |          |                      |                       |                 |         |

Further, the user data stored in the storage unit 216 is classified into one or more attributes, such as, but is not limited to, e-mail attributes, time attributes, geographical attributes and user attributes. E-mail attributes may include, but are not limited to, user name, given name, surname, display name and e-mail. Time attributes include, but are not limited to, user update, created date and time, last update time and previous start time. Geographical attributes include, but are not limited to, use location, country, time zone and preferred time zone. User attributes include, but are not limited to, active user, view Access Control List privileges and manager of the user.

In an exemplary embodiment of the present invention, the extraction service unit 210, during each sync cycle with the organization directory unit 206, is configured to verify and update manager related information for each user (i.e. employee) and captures a hierarchy between a manager and the user. The manager related information is stored in the storage unit 216 and used for providing authorization for viewing conversation threads associated with relevant criteria corresponding to the electronic communications of users who have left the organization or have been reassigned from the team, via the visualization unit 120 using a visualization portal. Further, the storage unit 216 comprises an all Access Control List (ACL) which is configured to provide rights to defined users for providing 'view' authorization to view conversation data of existing users or user who have left the organization. The visualization unit 120 provides an administration functionality via which a manager may carry out modifications in the 'view' authorization of the user who has left the organization and provides the existing or the new user with 'view' authorization for viewing conversation threads associated with the electronic communications.

In an embodiment of the present invention, the processed user data from the comparison service unit 212 is transmitted to the storage unit 216. The storage unit 216 is configured to store the processed user data associated with various users. In an embodiment of the present information, each user data entry in the storage unit 216 has a 'view Access Control List (ACL) field value associated with it. The 'view ACL' field value provides for inheriting electronic communications data by a user who is not originally part of the electronic communications data. Further, a default value of 'view ACL' field value has the same value as the user ID for default access by a user only to their own electronic communications data. The storage unit 216 is configured to provide access for defined users (based on organization defined user hierarchy and permissions) to change the 'view ACL' field value for providing 'view' authorization to the existing or new users in the organization for viewing particular conversations associated with the electronic communications of the user who has left the organization (i.e. a former user) or has been reassigned. The 'view' authorization is provided to the existing or new users based on, but is not limited to, account name, territory and geographic location. Advantageously, 'view' authorization aids in better access of a former user's conversation associated with the electronic communication at a granular level. Further, 'view' authorization aids in providing the existing or new users with the entire conversation thread associated with the electronic communication, instead of just forwarding the conversation threads to the existing or new user. Yet further, 'view' authorization aids in providing access to attachment revision history for a particular inherited conversation thread associated with the electronic communication such that the new user or the reassigned user has rights to view only the specific electronic communications data, based on specific criteria, of the user who has left the organization and not his/her personal electronic communications data.

In an embodiment of the present invention, the active user data is stored in the active user list unit 214 in the first repository 202 for determining which users are currently active and whose communication data needs to be extracted by the scheduler queue unit 112, 302 for further processing. A user is considered active if the user is listed as currently employed with the organization or has an active entry in the organization directory unit 206. Further, the exclusion list unit 218 is configured to maintain an exclusion list of users (as defined by the organization) whose communication data needs to be excluded from being extracted by the scheduler queue unit 112, 302. In an embodiment of the present invention, the scheduler queue unit 112, 302 is configured to communicate with the exclusion list unit 218, prior to scheduling the user communication data extraction from the communication source unit 110, for carrying out a check and determining whether the user is in the exclusion list.

In an exemplary embodiment of the present invention, referring to FIG. 3, if the user data is in the exclusion list or the user data is not currently active or the user is not in the current time zone, then the scheduler queue unit 112, 302 does not schedule extraction of the user's communication data. In another exemplary embodiment of the present invention, if the user data is not in the exclusion list and the user data is currently active and the user data is in the current time zone, then the user data is transmitted for queuing in the scheduler queue unit 112, 302.

Figure 4:
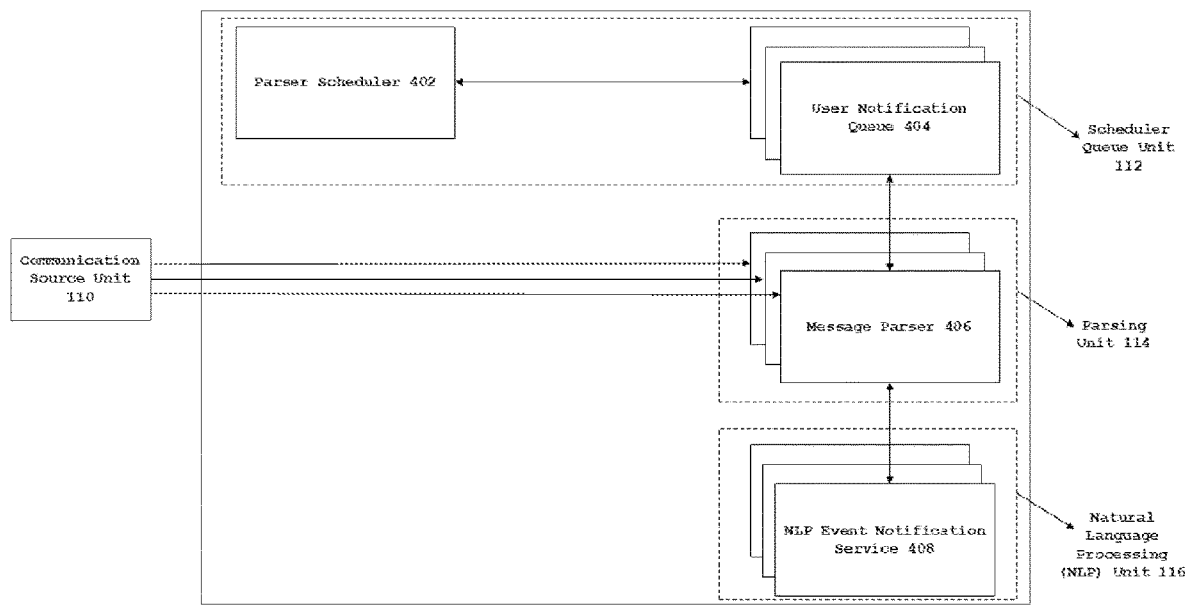
FIG. 4 illustrates a communication data extraction process flow from the repository, in accordance with an embodiment of the present invention.

In another exemplary embodiment of the present invention, the scheduler queue unit 112, 302 uses a distributed event streaming platform to ensure that all users scheduled for electronic communication data extraction are maintained in a secure and scalable queue. Referring to FIG. 4, this queue aids the message parser 406 within the parsing unit 114 (FIG. 1) to process only the selected users in the queue based on the order in which the users were added to the queue. FIG. 4 is explained in detail in the later part of the specification. Advantageously, this ensures the processing of user's electronic communication data beyond normal processing times for users in a particular time zone that may present more than average number of active users. Further, advantageously, the user notification queue 404 is scalable and is executed by one or more queue operations such as, but not limited to, Java Management Extensions (JMX) and Kafka.

In an embodiment of the present invention, the scheduler queue unit 112 is configured to organize users for extraction of their electronic communications data present in the communication source unit 110 in a defined order. In an embodiment of the present invention, the engine 104 is configured to employ authentication techniques for authenticating and authorizing the parsing unit 114 for connecting to the communication source unit 110 for accessing and extracting electronic communications data present in the communication source unit 110. In an exemplary embodiment of the present invention, if a Single Sign-On (SSO) functionality is implemented on the communication source unit 110, then the parsing unit 114 uses one or more defined SSO tokens for authentication and providing read access to the electronic communications data present in the communication source unit 110. In an embodiment of the present invention, the scheduler queue unit 112 is configured to select active users in the first repository 118 in a particular time zone at pre-defined time intervals (e.g. 30-minute intervals) so as to cover all time zones and subsequently extract electronic communications data (e.g. e-mails) sent or received during the previous calendar day to the communication source unit 110 (e.g. data in mailboxes) in that time zone. Thereafter, the scheduler queue unit 112 queues the selected user data, using an event notification queue, for sending to the parsing unit 114 for extraction of electronic communications data for the scheduled users.

Figure 7:
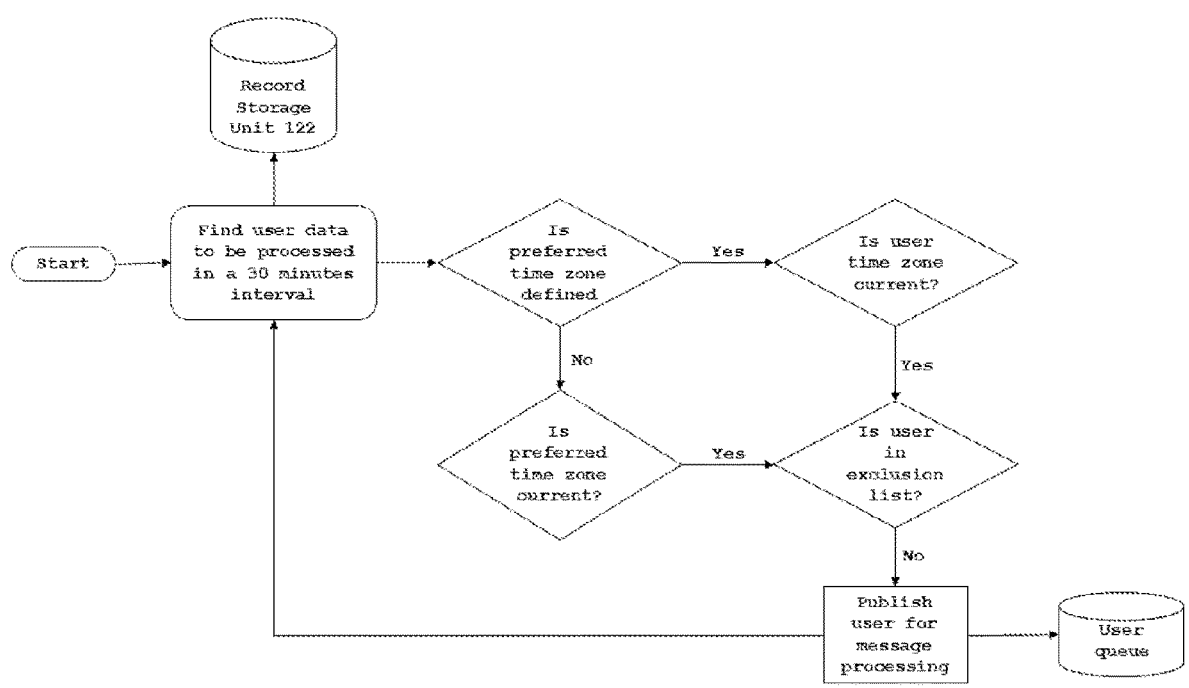
FIG. 7 is a flowchart illustrating electronic communications data extraction by a scheduler queue unit, in accordance with an embodiment of the present invention.

FIG. 4 illustrates an electronic communications data extraction process from the communication source unit 110 (FIG. 1) for using the extracted data in a parsing operation and carrying out a deduplication process. In an embodiment of the present invention, the scheduler queue unit 112 (FIG. 1) comprises a parser scheduler 402 for scheduling extraction of active user data from the first repository 118 and extracting electronic communications data associated with the active user data from the communication source unit 110. FIG. 7 is a flowchart illustrating electronic communications data extraction by the scheduler queue unit (112). The parser scheduler 402 is invoked at a pre-defined time interval (e.g. every 30 minutes) and performs a check whether users are available for that specific time zone for electronic communications data extraction. The parser scheduler 402 further performs a check to determine whether users have been added in the exclusion list unit 218 (FIG. 2) or if the users have been classified as inactive since the last extraction before processing the user data for extraction.

In an embodiment of the present invention, the parsing unit 114 is configured to extract electronic communications data associated with the users queued for extraction by the scheduler queue unit 112. In an embodiment of the present invention, the parsing unit 114 checks for duplicate data associated with the electronic communications data by carrying out the deduplication process. The parsing unit 114 extracts electronic communications data for processing by selected users in a user notification queue 404 in the scheduler queue unit 112. The parser unit 114 parses each individual user communication data and compares the individual electronic communications data with previously parsed communication information stored in the record storage unit 122 (FIG. 1) based on unique identifiers (for e.g., message ID, time stamp, origin, etc.). In the event an electronic communication has already been processed by the parser unit 114, then the record storage unit 122 returns a valid unique identifier as evidence for the processed and stored communications data. The parser unit 114 stops any further processing of that communications data and proceeds to the next communications data. Further, the parsing unit 114 is configured to process the user data based on a multithreaded implementation of message parsers 406 for the active users in the scheduler queue unit 112 for extracting the electronic communications. Advantageously, the message parsers 406 are scalable and distributed parsers and process large amount of user data concurrently. Further, each message parser 406 is multithreaded and processes the user data based on available computing capacity. Subsequent to the extraction of the electronic communication, the parsing unit 114 is configured to provide the extracted electronic communications data to a NLP event notification service 408 of the NLP unit 116. In an exemplary embodiment of the present invention, the NLP event notification service 408 is executed by the queue operations such as, but are not limited to, the Java Management Extensions (JMX) and the Kafka.

In an embodiment of the present invention, the parsing unit 114 is configured to continuously track date and time-period of a last extraction of the electronic communication data from the communication source unit 110. Tracking of the electronic communication data aids in carrying out a phased and consistent extraction.

Figure 8:
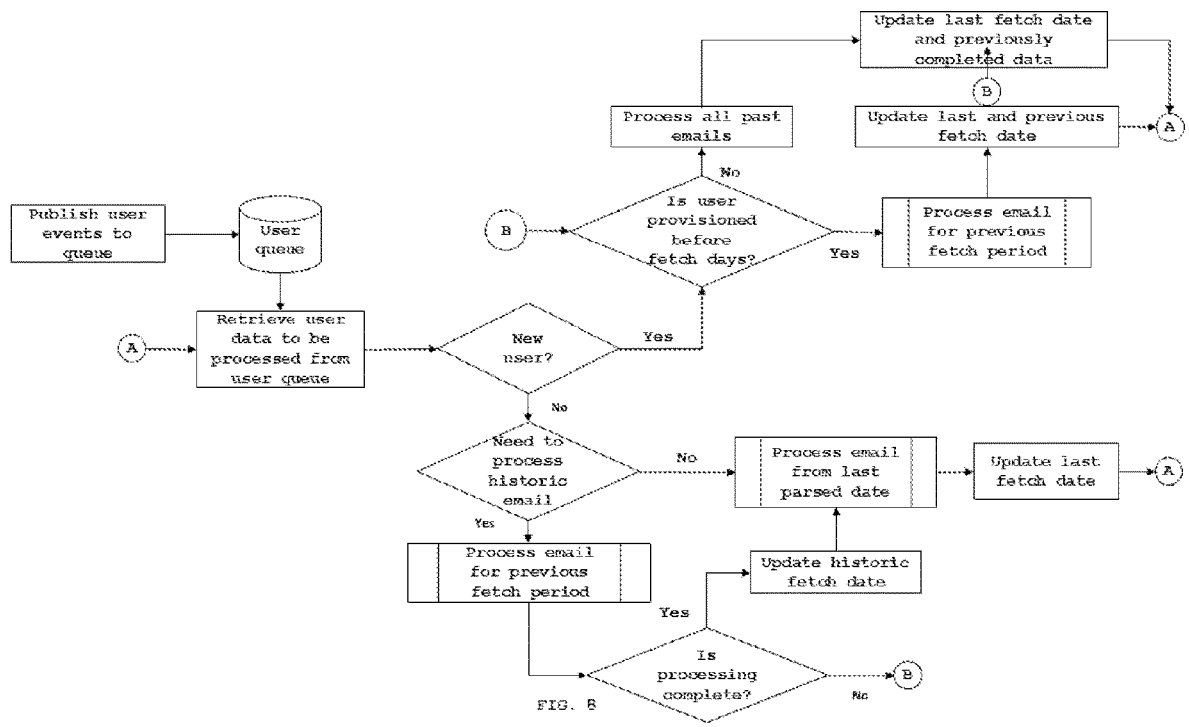
FIG. 8 is a flowchart illustrating message processing by a message processing thread, in accordance with an embodiment of the present invention.

In an embodiment of the present invention, the extracted active user data is received by the user notification queue 404 of the scheduler queue unit 112. The message processing thread of message parser 406 selects a user from the user notification queue 404 for processing, as depicted by the flowchart illustrated in FIG. 8. The message processing thread of the message parser (406) performs a check to determine whether the user data is being processed for the first time. Further, if the user data is determined to be processed for the first time, then it is checked whether that user data associated with the electronic communications data is an existing user data and whether the user data requires historical data extraction. In an embodiment of the present invention, in the initial implementation, the message parser 406 is configured to extract the historical electronic communications data based on a pre-configured maximum age of electronic communications data (e.g. electronic communications data from last two years). In this embodiment of the present invention, the entire electronic communication data is not extracted in one day. The electronic communications data is only extracted for a predefined number of days. Further, each day of ingestion extracts the electronic communications data for a predefined number of past days. Therefore, advantageously, defining predefined number of days for electronic communications data extraction ensures consistency of electronic data extraction for all users with accuracy.

In an embodiment of the present invention, the electronic communications data for each user is parsed by the message parser 406 from the last parsed date to the previous day of extraction of the electronic communications data. Further, for past electronic communications data, if it is determined that the number of days of electronic communications data to be extracted is greater than user joining date or exceeding the date of electronic communications data extraction for a maximum time period (e.g. 2 years), then the last electronic communications data to be processed is taken from the date of joining of the user or from a maximum time period. For example, in the initial implementation, if a 60-day cycle is implemented for historical electronic communications data extraction and the last cycle reaches a defined parameter, such as, but not limited to, an employee date of joining or the organization defining maximum extraction period of say 2 years, then the extraction of electronic communications data for that user stops and the defined parameter is marked as a start date from which the electronic communications data associated with the user is available.

Figure 5:
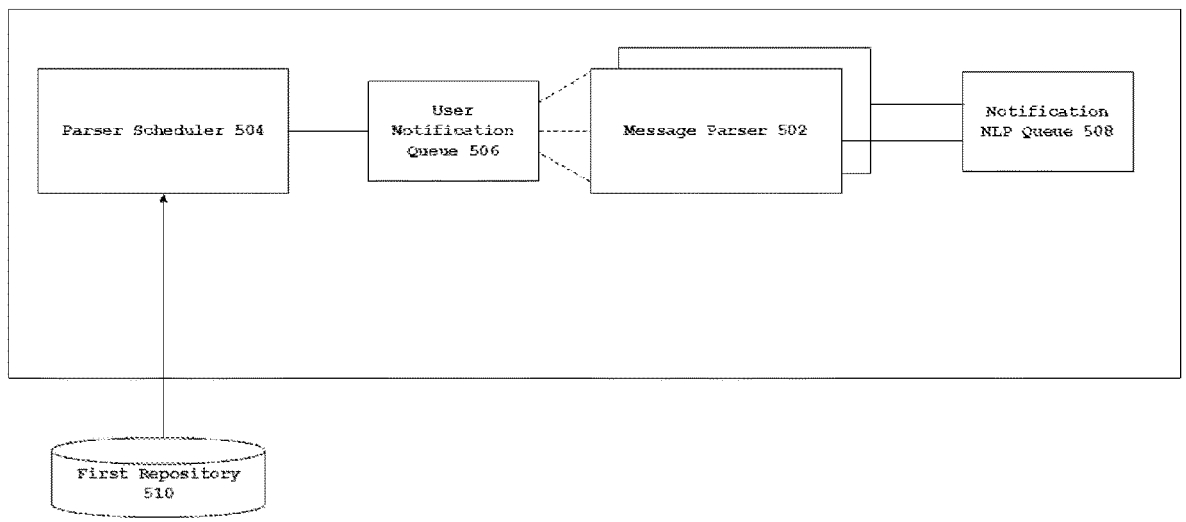
FIG. 5 illustrates a pipeline diagram for a parsing unit, in accordance with an embodiment of the present invention.

FIG. 5 illustrates a pipeline diagram for executing the parsing unit 114 (FIG. 1). In an embodiment of the present invention, the message parser 502 in the parsing unit 114 is configured to extract electronic communications data for selected users for processing from the user notification queue 506 provided by the parser scheduler 504. The message parser 502 performs the electronic communications data extraction based on at least the time zone associated with the user, the time zone preferred by the user or time zone set by the organization's administrator for the user. The parser scheduler 504 is based on an active-passive architecture and is connected to a first repository 510 for accessing user data for carrying out electronic communication extraction for the particular user. The extracted list of active users is provided to a user notification queue 506 present in the scheduler queue unit 112 (FIG. 1). Further, each thread of the message parser 502 in the parsing unit 114 (FIG. 1) is configured to select an active user from the user notification queue 506 and the electronic communication data from communication source unit 110 associated with the selected active user is extracted. Further, subsequent to completion of processing of each electronic communications data associated with the selected active user, the processed electronic communications data is converted to a custom record format by the message parser 502 for storage in the record storage unit 122. In an exemplary embodiment of the present invention, storage of the processed electronic communications data in the record storage unit 122 (FIG. 1) is carried out using at least a custom JavaScript Object Notation (JSON) format, object store format, or a Graph format. The custom record format is then added to the notification NLP queue 508 for processing by the NLP unit 116 (FIG. 1) and subsequently stored in a sub-record storage unit 1004 (FIG. 10), as elaborated later in the specification.

Figure 9:
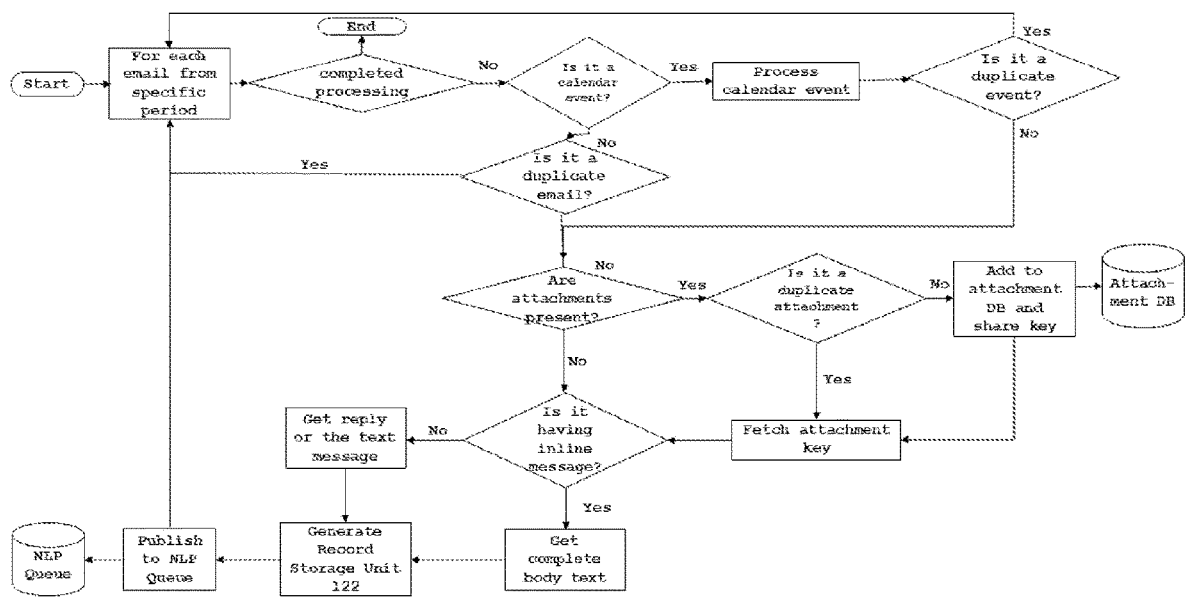
FIG. 9 is a flowchart illustrating determination of an electronic communications data as a calendar invite or a regular message, in accordance with an embodiment of the present invention.

Referring to FIG. 4, in an embodiment of the present invention, the message parser 406 analyses each electronic communications data in the communication source unit 110 and determines whether the electronic communications data is at least a calendar invite or a regular message. FIG. 9 is a flowchart illustrating a process for determining whether the electronic communications data is at least a calendar invite or a regular message. Further, if the electronic communications data is a calendar invite, then the electronic communications data is processed in the form of a calendar to determine an invite flow by identifying one or more variations associated with the calendar such as, but not limited to, details of a calendar invite (such as, sender, time, duration, attendees, communication channel, etc.), a calendar response (such as, accept, decline or tentative) and a calendar cancellation. Further, if the electronic communications data is the regular message, then the message parser 406 processes the body and attachment (if any) of the regular message. The attachment is transmitted to the record storage unit 122 (FIG. 1) for storage after carrying out a deduplication process. In an exemplary embodiment of the present invention, deduplication process of attachment is carried out based on a SHA hash 256 or a similar technique. Further, if the attachment already exists in the record storage unit 122 (FIG. 1), then a key of the attachment already available in the record storage unit 122 is retrieved and subsequently updated in the custom record.

Figure 10:
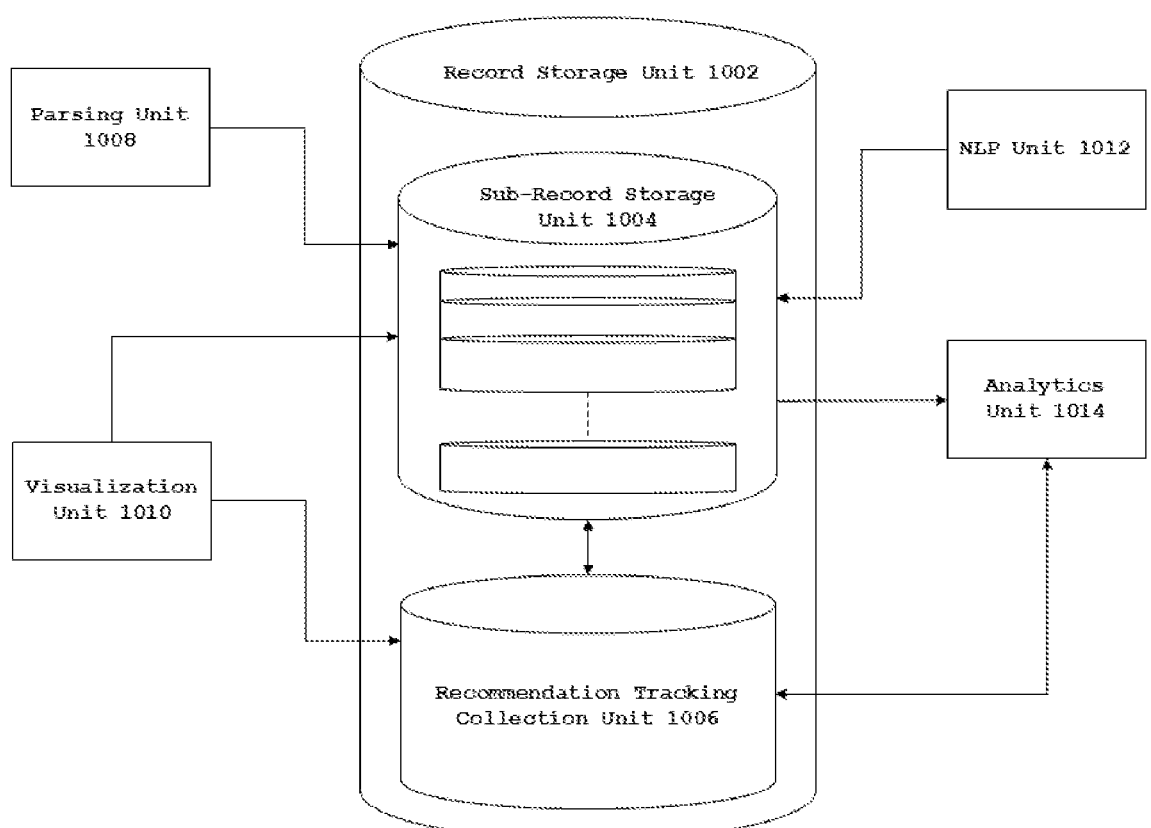
FIG. 10 illustrates a detailed block diagram of a record storage unit, in accordance with an embodiment of the present invention.

In an embodiment of the present invention, the message parser 406 (FIG. 4) is configured to perform a check for determining duplication of the electronic communications data, i.e. whether the electronic communications data has been processed or not, by checking whether an electronic communications data ID exist in the record storage unit 122 (FIG. 1) or not. If the electronic communications data ID exists in the record storage unit 122 (FIG. 1), then the electronic communications data is not processed or stored in the record storage unit 122 (FIG. 1). Therefore, the message parser 406 (FIG. 4) is configured to process and store only unique electronic communications data in the record storage unit 122 (FIG. 1) using a custom format. Identical extracted electronic communications data are identified which may be associated with multiple users to reject duplicate electronic communications data from being stored in the record storage unit 122 (FIG. 1). This significantly reduces storage space required for the record storage unit 122. In an exemplary embodiment of the present invention, the duplicate parsed header and subject, duplicate parsed body of the conversations data associated with the electronic communications data and the duplicate attached documents, referred to as duplicate data, are analyzed and removed by the parsing unit 114 based on a deduplication (DeDupe) check process prior to transmitting to the record storage unit 122. Further, if a response to the electronic communications data is identified as having references to inline electronic communications data replies, then the entire electronic communications data is captured in the custom format. Further, each processed electronic communications data in custom format is transmitted to the notification NLP queue 508 (FIG. 5) for further processing and subsequently stored in the sub-record storage unit 1004 (FIG. 10) of the record storage unit 1002 (FIG. 10).

In an embodiment of the present invention, the NLP unit 116 is configured to carry out a keyword tagging operation on the custom record formatted electronic communication data in the notification NLP queue 508 (FIG. 5). The NLP unit 116 is configured to parse the conversation data associated with the electronic communications data and search for one or more relevant keywords in the conversation data associated with the electronic communications data. Further, tagging of the keywords in the electronic communications data is based on a pre-generated keywords map, referred to as a pilot dictionary, to process such keywords. The tagging of keywords aids in determining relevance of each conversation data associated with the electronic communications data, possible transitions in a particular conversation data associated with the electronic communications, determining the organization specific conversation terms and the subsequent steps that may need to be taken.

In an embodiment of the present invention, the NLP unit 116 is configured to receive the parsed data as input from the parsing unit 114 for extraction of the keywords. The parsed data from the parsing unit 114 is provided to the NLP unit 116 based on the NLP event notification queue 508. In an exemplary embodiment of the present invention, the NLP unit 116 is configured with the pilot dictionary comprising natural language words and phrases which are of relevance to the organization. The pilot dictionary is generated based on a learning process during the initial deployment phase by the NLP unit 116. The NLP unit 116 is configured to use the pilot dictionary to parse the initial electronic communications data in order to develop a Natural Language (NL)

vocabulary which is specific to the organization. Further, the developed NL vocabulary is used to analyze the natural language associated with the future electronic communications. The NL vocabulary is fine-tuned based on one or more NL datasets associated with initial electronic communications data of the organization. In an embodiment of the present invention, the development of the NL vocabulary is an iterative process performed during the initial deployment of the solution. The NLP unit 116 (FIG. 1) is configured to carry out a first iteration for identifying electronic communications data stored within the record storage unit 122 (FIG. 1) in order to train the pilot dictionary data set from the stored electronic communications data for developing the NL vocabulary. Further, the NLP unit 116, in subsequent iterations, is configured to establish a relationship with the stored electronic communications data based on 1-$n^{th}$ level of transitivity. The iterations are customizable based on one or more development parameters associated with the NL vocabulary.

In an embodiment of the present invention, subsequent to development of the NL vocabulary, the NLP unit 116 is configured to further parse the stored electronic communications data in the record storage unit 122 (FIG. 1) for converting the stored electronic communications data into one or more detailed electronic communications data records. The detailed electronic communications data records are stored in the sub-record storage unit 1004 of the record storage unit 1002. In an embodiment of the present invention, the developed NL vocabulary is employed for the incoming electronic communications data for identifying the keywords and saving in the detailed electronic communications data records. The stored keywords are used by the analytics unit 1014 (130, FIG. 1) for further processing. Further, the identified keywords are appended to the respective detailed electronic communications data records stored in the sub-record storage unit 1004 of the record storage unit 1002.

In an embodiment of the present invention, each parsed electronic communications data is analyzed by the parsing unit 114 to quantify the relevance to the organization. In an exemplary embodiment of the present invention, an initial dictionary (i.e. the pilot dictionary) is used by the parsing unit 114 to ascertain the context and relevance of each conversation that is parsed by the parsing unit 114 for the organization. The context and relevance are determined based on weights, repetitions and functionality associated with the electronic communications. During initial deployment of the pilot dictionary, a sample set (for example, 500,000 communications) is split into a 4:1 ratio for dictionary training and testing. Further, during the initial deployment of the pilot dictionary, the output of the parser unit 114 for the sample set is directly stored, in a custom format, in the record storage unit 122 instead of being sent to the NLP event notification queue 508 (FIG. 5). Each communication in this initial communication set is analyzed for context and relevance with the pilot dictionary. Each keyword is determined as relevant based on the presence of one or more words from the pilot dictionary and each relevant word is further added to the pilot dictionary for use in subsequent conversation analysis. This process aids in enhancing and improving the pilot dictionary for the organization as well as learning the specific terms used by the organization in the course of operation.

Further, keywords corresponding to an entity associated with the electronic communications data are stored as a first tag for each electronics communications data in a custom record format in the record storage unit 122. Examples of keywords include, but are not limited to, sender name, customer domain, and timestamp. Advantageously, tags aid in understanding characteristics such as, but not limited to, user behavior, business health, responsiveness and customer interaction. The tags are transmitted to the analytics unit 130 for analysis and to the visualization unit 120 for enhanced access control and search capabilities.

In an embodiment of the present invention, subsequent to analysis of the initial communication set, the pilot dictionary is considered as the main dictionary for all further analysis for determining context and relevance from all subsequent electronic communications. Each electronic communications data from the initial electronic communications data set is analyzed using the pilot dictionary and each keyword corresponding to the analyzed electronic communications data is stored as a second tag in a custom record format for that electronic communication in the record storage unit 122. Further, all subsequent electronic communications (beyond the initial communication set) are processed by the parser unit 114 and passed to the NLP event notification queue 508 (FIG. 5) for further processing.

In an embodiment of the present invention, the NLP unit 116 is further configured to pre-process the electronic communications data by cleaning the electronic communications data to reduce noise in the electronic communications data, tokenize the content in the electronic communications data, implement a lemmatization operation for reducing the words to their root form and selectively learn from the electronic communications data for extracting contextual and relevant data from the electronic communications data. The pre-processing process aids in refining understanding of language associated with the electronic communications data by the system 100 and improving the pilot dictionary.

In an embodiment of the present invention, the NLP unit 116 receives parsed electronic communications data from the NLP notification queue 508 (FIG. 5). The electronic communications data received is cleaned by the NLP unit 116 to remove standard communication artifacts such as, but not limited to, punctuations, and other content that may lack relevance. The cleaned data is further tokenized by the NLP unit 116. The NLP unit 116 breaks down sentence structures into elements such as, but not limited to, words, characters, sub-words. The tokenization operation relates to separating the cleaned data into smaller elements, referred as tokens. The tokens may be associated with, but are not limited to, words, characters and sub-words. The tokenization operation may, therefore, be classified as word, character and sub-word tokenization operation. The NLP unit 116 further removes stop words such as, but not limited to, articles, etc. which are a list of pre-defined words that are used for stringing the conversations, associated with the electronic communications data, together which do not have relevance from the conversation perspective. Advantageously, removal of stop words aids in creating a cohesive first grouping of keywords present in the cleaned data in order to understand the context of the conversations. The remaining words, phrases are analyzed with reference to the pilot dictionary to ascertain relevance of the communication to the organization. Keywords found relevant are added to the pilot dictionary as part of the dictionary improvement process.

In an embodiment of the present invention, the NLP unit 116 is further configured to implement the lemmatization operation for reducing the words to their root form (i.e. base word). Advantageously, lemmatization operation reduces the words associated with the tokens to their base word, thereby reducing the inflected words and ensuring that the base word belongs to the conversation. Further, in the lemmatization operation the root word is referred to as lemma. The lemma is at least a canonical form, a dictionary form or a citation form of a set of words. The processed keyword information is then further processed by the NLP unit 116.

In an embodiment of the present invention, the NLP unit 116 analyzes the nature of the entity associated with the electronic communications including context and relevance based on keyword recurrence, weights, repetitions and functionality associated with the electronic communications. The NLP unit 116 is configured to analyze the pre-processed parsed data in order to carry out a recognition operation between entities associated with the electronic communications data and context present in the electronic communications data associated with the parsed electronic communications data for distinguishing between the entities and the context. The recognition operation between the entities and the context in the electronic communications data is carried out based on a semantic analysis of the parsed electronic communications data. The recognition operation for context is further carried out based on assimilated learning techniques in addition to carrying out of the semantic operation. In an embodiment of the present invention, the NLP unit 116 is configured to generate a text and a hypothesis semantic graph, which is a structured linguistic representation comprising information related to semantic electronic communications data. The semantic graphs are generated based on typed dependency graphs, in which each node is a word and labelled edges represent grammatical relations between the words. A semantic graph for a sentence contains a node for each word of the sentence and each node is embedded with metadata generated by a toolkit of linguistic processing tools, including, but are not limited to, word lemmas, parts of speech and named entity recognition. This data is processed to improve the pilot dictionary as well as to improve the analytics capability of the analytics unit 130. In an embodiment of the present invention, the analytics unit 130 uses the electronic communications data to further determine and establish relationships with the other electronic communications data analyzed using machine learning algorithms such as, but not limited to, neural networks techniques.

In an embodiment of the present invention, the NLP unit 116 is configured to utilize output of the semantic operation and the assimilated learning techniques to further process the parsed electronic communications data, determine relationships between the tags associated with the parsed electronic communications data and thereafter generate a score for each relationship. Further, the NLP unit 116 is configured to communicate with the record storage unit 122 for storing the output of the semantic operation and assimilated learning techniques in the sub-record storage unit 1004 (FIG. 10). Post analysis, the determined keywords, their corresponding lemma and the relevance based on keyword recurrence, weights, repetitions and functionality associated with the electronic communications are added to the custom record format of the corresponding electronic communications and stored in the record storage unit 122.

FIG. 10 illustrates a detailed block diagram of a record storage unit 1002 (122, FIG. 1), in accordance with an embodiment of the present invention. The record storage unit 1002 comprises the sub-record storage unit 1004 and a recommendation tracking collection unit 1006. The record storage unit 1002 is a central repository of all custom formatted records generated by the NLP Unit 1012 (116, FIG. 1) associated with the organization. In an embodiment of the present invention, the sub-record storage unit 1004 of the record storage unit 1002 is configured to receive an input as a parsed electronic communications data in custom format related to one or more conversation parameters of the electronic communications data comprising, the parsed header, subject, the parsed body of the conversations data associated with the electronic communications data along with the attached documents present (if any) with the analyzed conversations data from the NLP unit 1012 (116, FIG. 1) for storage and future retrieval. Further, the sub-record storage unit 1004 is configured to store the one or more conversation parameters associated with the electronic communications data. The sub-record storage unit 1004 is configured to store only a single copy of the data received from the parsing unit 1008 (114, FIG. 1) as an electronic communications data object in order to avoid duplication. The storage record unit 1002 is configured to ensure the data is retained within the organization's computing environment and no data leaves the computing environment to ensure security and data compliance requirements of the organization. Further, no data is sent to any external organization as well as to a solution provider.

In an embodiment of the present invention, the analytics unit 130 (FIG. 1) is an artificial intelligence based component configured to determine behavioral patterns of a user associated with the electronic communications data stored in the sub-record storage unit 1004 (FIG. 10) of the record storage unit 122 (1002, FIG. 10). The analytics unit 130 determine behavioural patterns by carrying out analysis of the electronic communications data stored in the sub-record storage unit 1004 (FIG. 10). The analytics unit 130 is further configured to communicate with the one or more information units 132 based on an Application Programming Interface (API) integration. In various embodiments of the present invention, the analytics unit 130 is continuously trained for improved operation. Further, no data is sent to any external organization as well as a solution provider from the analytics unit 130.

In an embodiment of the present invention, the analytics unit 130 is configured to generate a multi-relational model for determining behavioural patterns of users associated with the electronic communications data stored in the sub-record storage unit 1004 (FIG. 10). The analytics unit 130 processes electronic communications data based on user syntax and the electronic communications data object stored in the sub-record storage unit 1004 (FIG. 10). The multi-relational model provides relationship of the electronic communications data with other electronic communications data stored in the sub-record storage unit 1004 (FIG. 10). For example, a communication may be in the form of an email to a customer and a few colleagues with an attachment for a product sales proposal. Each email represents an independent entity with distinct relationships with multiple users including, but not limited to, one sender and multiple recipients, multiple attachments, one or more customers, an opportunity, etc. as well as distinct properties including, but not limited to, timestamp, subject, etc. Similarly, every single email conversation has similar relationships which contributes to the generating of a multi-relationship model. These attributes, relationships and properties are used to build a relational view for the user and similar users in the organization.

Figure 11:
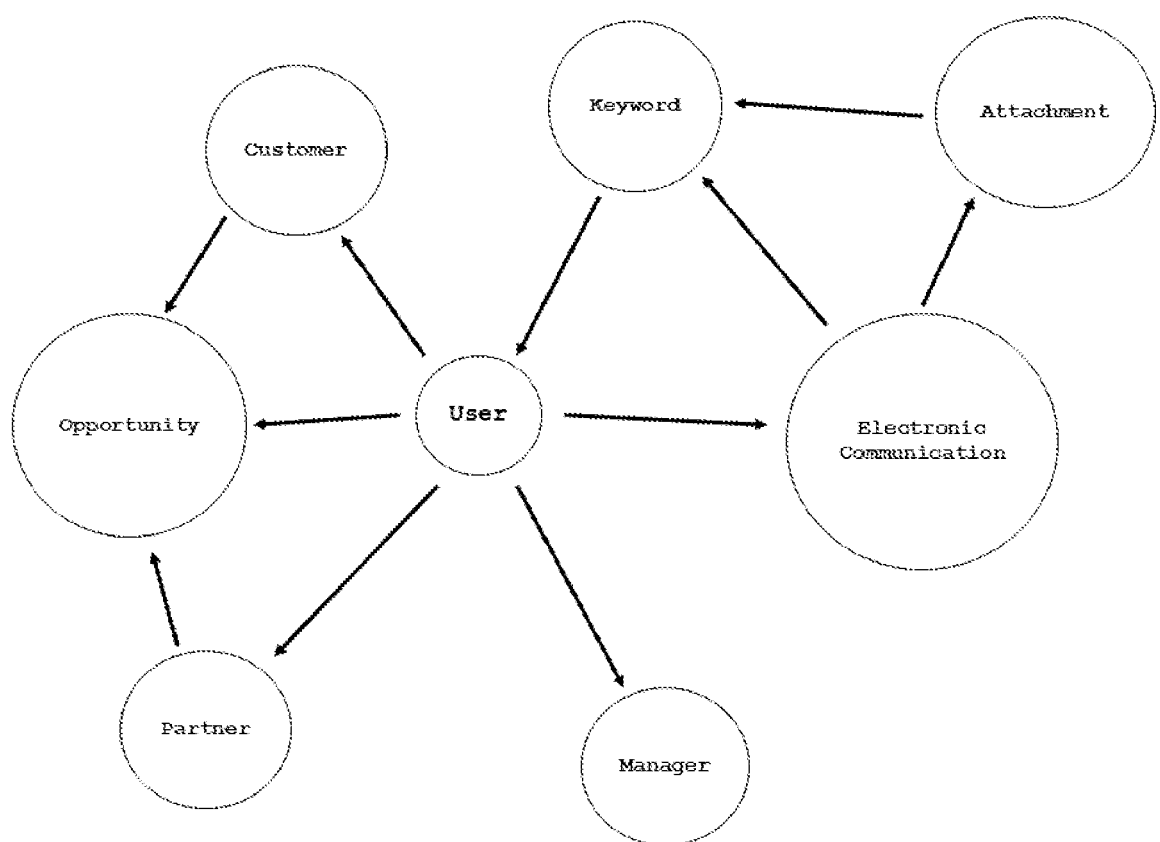
FIG. 11 illustrates a querying model depicting communication between various nodes of the querying model, in accordance with an embodiment of the present invention.

In an embodiment of the present invention, the analytics unit 130 is configured to communicate with the NLP unit 116 for receiving signals representing relevance of the keywords stored as data in the sub-record storage unit 1004 (FIG. 10) with respect to the electronic communications data. In an embodiment of the present invention, based on the relevant keywords and the keywords stored as the first and the second tag in the record storage unit (122), the analytics unit 130 generates a querying model. The querying model represents conversation data associated with the electronic communications data in the form of graph nodes (or similar), thereby providing the multi-relational model. The querying model is represented in FIG. 11 comprising various nodes and illustrating communication between various nodes of the querying model.

In an example, a user node has a one-to-one relationship with an electronic communication node when the user is a sender. The electronic communication node has a one-to-many relationship with many recipient user nodes. Further, each electronic communication node has a one-to-one relationship with said electronic communications body and header nodes, but has a one-to-many relationship with any of the attachment nodes that may have been a part of that electronic communication as well as all the keyword nodes that are associated with the electronic communication. The analytics unit 130 determines behavioural patterns associated with the data stored in the sub-record storage unit 1004 (FIG. 10) based on the querying model. The analytics unit 130 analyzes types, frequencies and strength of the electronic communications data between users within the organization and outside the organization. The analytics unit 130 further analyzes cross-references between electronic communications data comprising specific keywords. Further, the analytics unit 130 is configured to continuously determine behavioural patterns.

In an embodiment of the present invention, the analytics unit 130 is configured to use neural network techniques for continuously determining existing relationships, new relationships and undefined behaviour patterns between the extracted electronic communications data and other data stored in the sub-record storage unit 1004 (FIG. 10). In an embodiment of the present invention, the analytics unit 130 is configured to employ an inductive neural network technique including, but is not limited to, a GraphSAGE technique on the querying model for continuously determining existing relationships, new relationships and undefined behaviour patterns between the extracted electronic communications data and other data stored in the sub-record storage unit 1004 (FIG. 10). The analytics unit 130 computes node embeddings for unseen nodes or relationships in the querying model using multiple techniques for continuously determining new relationships and undefined behaviour patterns associated with the electronic communications data and the data stored in the sub-record storage unit 1004 (FIG. 10). Using the multiple techniques, the analytics unit 130 constantly learns a function that generates node embeddings by understanding neighbouring nodes and properties associated with the nodes in order to compute node embeddings for unseen nodes or relationships in the querying model. Computing node embeddings for unseen nodes or relationships in the querying model aids in effective and time efficient determination of the existing relationships, new relationships and undefined behavioural patterns associated with the data stored in the sub-record storage unit 1004 (FIG. 10).

In an embodiment of the present invention, the analytics unit 130 (FIG. 1) is configured to integrate with the multiple (1-n) information units 132 via an analytics integration module (not shown) associated with the analytics unit 130. The analytics unit 130 integrates with the information units 132 based on an Application Programming Interface (API) level integration. The information units 132 include, but are not limited to, a Human Resource Management System (HRMS) and a Customer Relationship Management (CRM) system. In an embodiment of the present invention, the analytics unit 130 integrates with the information units 132 via the analytics integration module (not shown) for retrieving user specific data in order to update the first repository 118. In another embodiment of the present invention, the analytics unit 130 integrates with the information units 132 for determining changes that are to be recommended for updating the information units 132 based on the output of the analytics unit 130. In yet another embodiment of the present invention, the analytics unit 130 integrates with the information units 132 to ease user driven changes through direct API calls. In an exemplary embodiment of the present invention, the user may be associated with a certain set of customer accounts data within the organization's CRM and the analytics unit 130 integrated with the information units 132 via the analytics integration module (not shown) retrieves the data in order to update the first repository 118.

In another exemplary embodiment of the present invention, during analysis of the data stored in the sub-record storage unit 1004 (FIG. 10), if the analytics unit 130 detects a state change of the stored data (e.g. sending out of a proposal by a user), then the analytics unit 130 is configured to verify a current state of the stored data prior to making the recommendation of changes for updating the information units 132 (e.g. the current state in the information units 132 is 'qualification'). Further, the analytics unit 130 is configured to generate and send one or more API call based enquiries to the information units 132 via the analytics integration module (not shown) for recommendation of changes for updating the information units 132. In the event, if the current state of the stored data is identical to the proposed change, then the updates in the information units 132 is ignored. Further, if the current state is incorrect (e.g. the current state is 'qualification' and the recommended change in state is 'proposal'), then the analytics unit 130 is configured to retrieve the current state and the recommended change is transmitted to the reporting database 128 for storage and future retrieval.

In an embodiment of the present invention, the analytics unit 130 is configured to communicate with the reporting database 128 in order to transmit and store the determined behavioural patterns associated with the electronic communications data stored in the sub-record storage unit 1004 (FIG. 10) for each user. The storage of behavioural patterns aids in tracking the past behavioural patterns and maintaining key attribute data associated with each user. In an exemplary embodiment of the present invention, the reporting database 128 is particularly a repository of user behavioural patterns, associated with the data stored in the sub-record storage unit 1004 (FIG. 10) captured daily through analysis by the analytics unit 130, which are then aggregated to provide a weekly view, a monthly view, a quarterly view, an annual view as well as a custom timeline view via the visualization unit 120. The reporting database 128 is further configured to provide visualization of the stored behavioural patterns in a time bound comparison via the visualization unit (120), e.g. a week-over-week, custom time windows, etc.

In another embodiment of the present invention, the analytics unit 130 is configured to transmit one or more user behavioural patterns associated with the computed node embeddings for unseen nodes or relationships in the querying model to the reporting database 128. Further, the analytics unit 130 is configured to transmit one or more past user's behavioural patterns associated with the computed node embeddings for unseen nodes or relationships in the querying model to the reporting database 128.

In an embodiment of the present invention, one or more recommendations are provided to the users by the analytics unit 130 via the recommendation unit 126 based on the multi-relational model. The recommendations represent electronic communications related actionable suggestions, which may include, but are not limited to, a regular message or calendar invite, which the user may have missed responding to for 2 days, a follow-up with a customer on an electronic communication sent by the user, sending a pointer to another user in the organization working on a similar project or a solution or a technology reference in the user's electronic communications sent in a previous day, and a recommendation to create a new opportunity (if already not created) in the organization's CRM after a pre-defined period of interactions between the customer and the user. In another exemplary embodiment of the present invention, the recommendations may include to update the status of an opportunity in CRM based on progress analyzed by the analytics unit 130 (e.g. based on a proposal being sent or a demo having been concluded). In another exemplary embodiment of the present invention, the recommendations may include processing a previously received "deal won notification" from the organization which may be useful to the user based on the context, a reminder to setup a meeting with a customer (if not already scheduled) as mentioned in the previous day's electronic communications data, a notification of "view" rights being given to the user to a particular electronic communication data by another user (or the user's manager) with a link to view the entire electronic communications on the visualization unit 120, and a notification of a change in status for an opportunity the user is either involved in or has view rights. Further, the recommendations may vary depending on the type of the organization such as, but not limited to, sales, HR, supply chain, service delivery, etc. The time period of sending recommendations depends on the inputs received by the recommendation unit 126 from the analytics unit 130 and criticality of the recommendation.

In an embodiment of the present invention, the analytics engine 130 is configured to communicate with the recommendation unit 126 for sending the recommendation in the form of an electronic Recommendation Action communication (RAC) based on the multi-relational model. The recommendation sent to the user, requires the user to take a suitable action based on the sent recommendation. Further, the RAC may be a contextual or a periodic electronic communication comprising a recommended action in the form of recommendation, collaboration suggestions, data on performance and behaviour of each user in the organization.

In an embodiment of the present invention, the RAC comprises two delivery time frames including, a weekly RAC and a contextual RAC. In an exemplary embodiment of the present invention, the weekly RAC is sent to the user on every Monday at 9 AM in the user's time zone which comprises at least a summary of the previous week's electronic communications, collaborations and suggestions to improve sharing of electronic communications within the organization. The weekly RAC further provides a specific area of improvement in the performance of the user and further provides the user a detailed dashboard of the user's performance via the visualization unit 120 along with relative performance comparisons with other users. Further, the recommendation unit 126 may provide a summary data for demonstrating a change of the user behaviour from a previous week to a current week in the form of the weekly RAC. The recommendation unit 126 provides the summary data to the user as well as their manager with respect to the time-period between the receiving of the RAC with the recommendation by the user and the action taken by the user on the recommendation. Advantageously, the summary data aids in timely update of the information units 132, thereby improving efficiency and predictability of the working of the information units 132.

In another exemplary embodiment of the present invention, the contextual RAC provides data to the user, based on an analysis of the user's most recent electronic communications, including, but are not limited to, creating a new opportunity by using the information units 132 after analysis of an electronic communication with a prospect and 'no correlating' opportunity identifier in the information units 132. In yet another exemplary embodiment of the present invention, the contextual RAC provides data to the user including updating the status or stage of an opportunity (e.g. user updating opportunity stage from 'qualification' to 'proposal' after the detection of proposal related electronic communications with a prospect) by a single click on the visualization unit 120, which communicates with an appropriate information unit 132 using the analytics integration module (not shown) to facilitate the update. In another exemplary embodiment of the present invention, the contextual RAC provides data to the user including suggesting contact data of other users in the organization that are working on similar projects and opportunities in order to facilitate collaboration.

In an embodiment of the present invention, the RAC is scheduled by the recommendation unit 126 based on communicating with the reporting database 128 and processing the data stored in the reporting database 128. In an embodiment of the present invention, the recommendation unit 126 is configured to communicate with the first repository 118 in order to schedule the sending of the weekly RAC at a pre-determined time to all the users in a particular time zone. Further, the recommendation unit 126 is configured to send the contextual RAC based on availability of the analysis of the user's most recent electronic communications, thereby providing faster responses to users with better insights. In an embodiment of the present invention, the RAC comprises embedded API calls which are used for providing updates to the information units 132 with a single click via the analytics integration module (not shown). Further, actions on each of these recommendations associated with the RAC, when initiated by a user, is received by the respective information units 132 and at the same time, the recommendation tracking collection unit 1006 (FIG. 10) in the record storage unit 1002 (FIG. 10) is updated with action taken on the recommendation. Timeline for the action on the recommendation and the type of response is recorded in the recommendation tracking collection unit 1006 (FIG. 10) using APIs embedded in the RAC. Advantageously, the embedded API aids in providing control to the user on any change made to the information units 132 using the analytics integration module (not shown). The weekly RAC and the contextual RAC may be sent to the user in the form of pictorial and textual stories in electronic communications, which can also be visualized in greater detail by the user on the visualization unit 120.

Figure 12A:
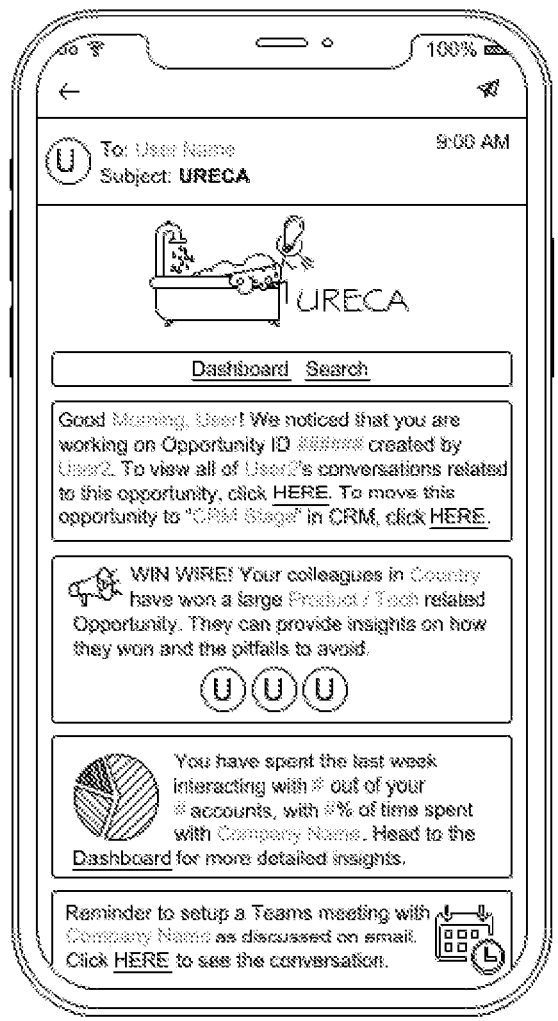
FIGS. 12a-12c illustrate templates used for weekly Recommendation Action Communication (RAC) and contextual RAC via a visualization unit on a user device, in accordance with an embodiment of the present invention.
Figure 12B:
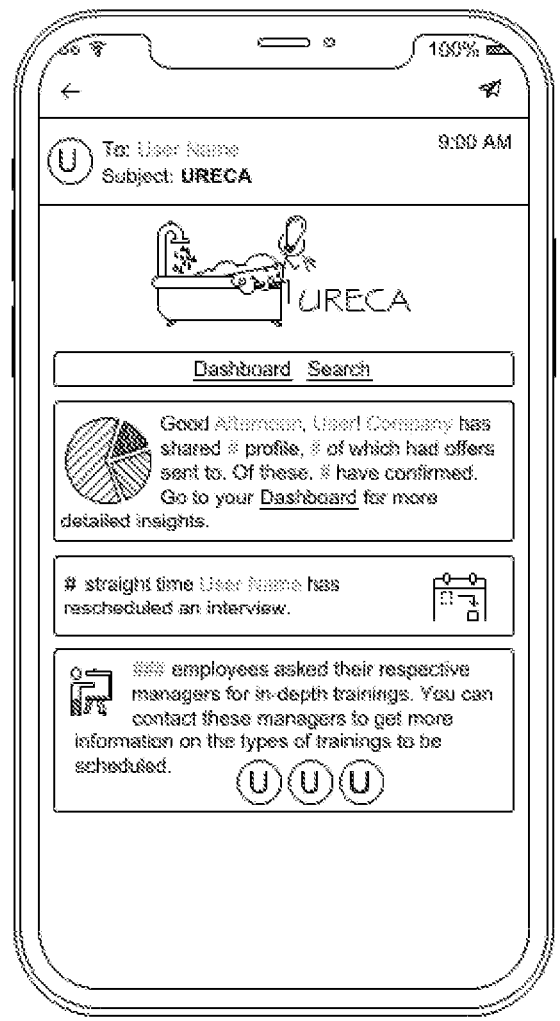
Figure 12C:
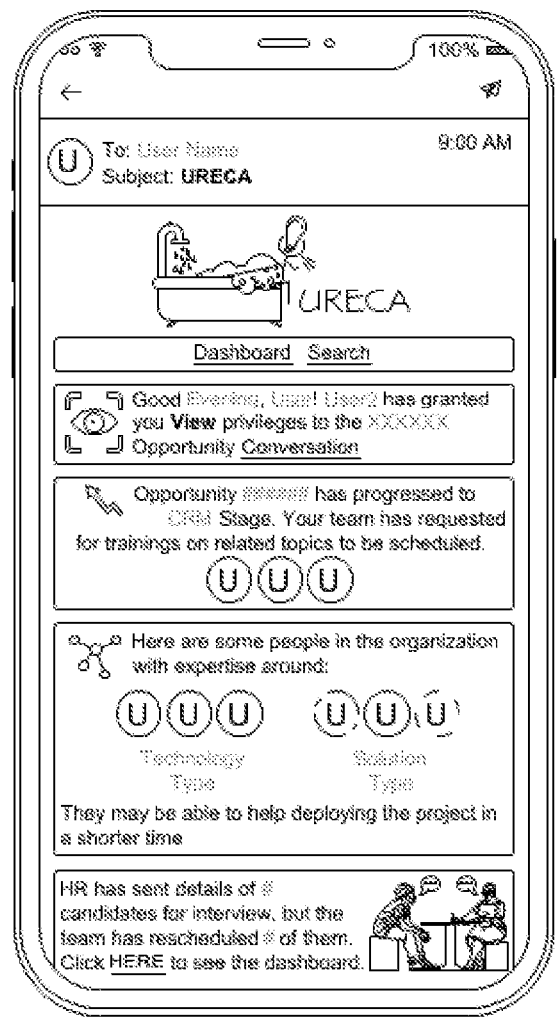
Figure 13A:
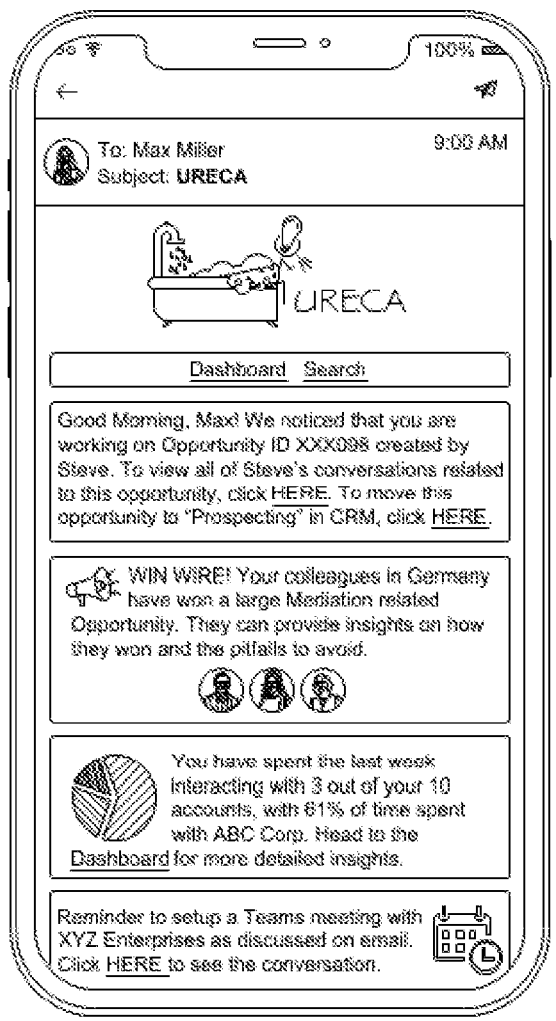
FIGS. 13a-13c illustrate the weekly RA communications and contextual RA communications sent to users, using the templates illustrated in FIGS. 12a-12c, in accordance with an embodiment of the present invention.
Figure 13B:
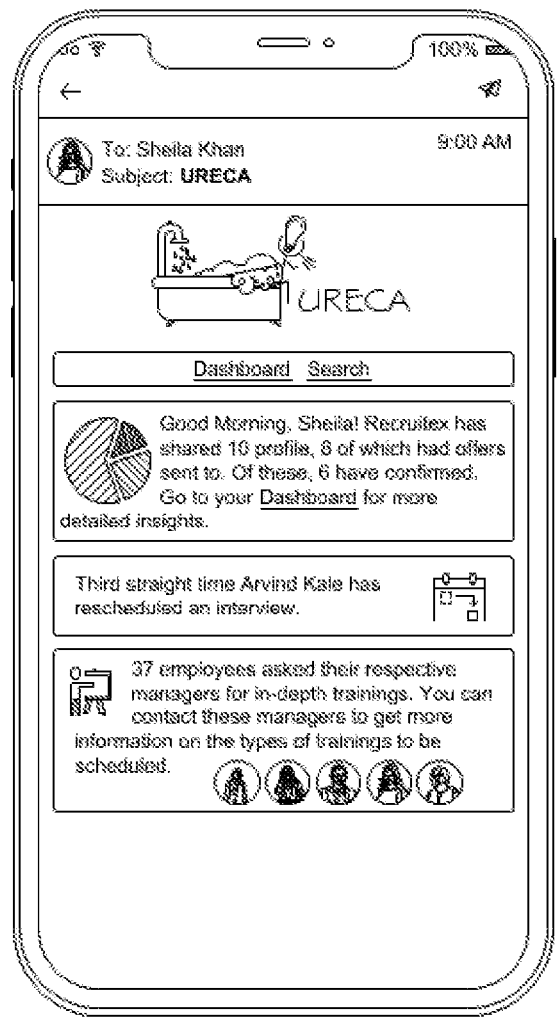
Figure 13C:
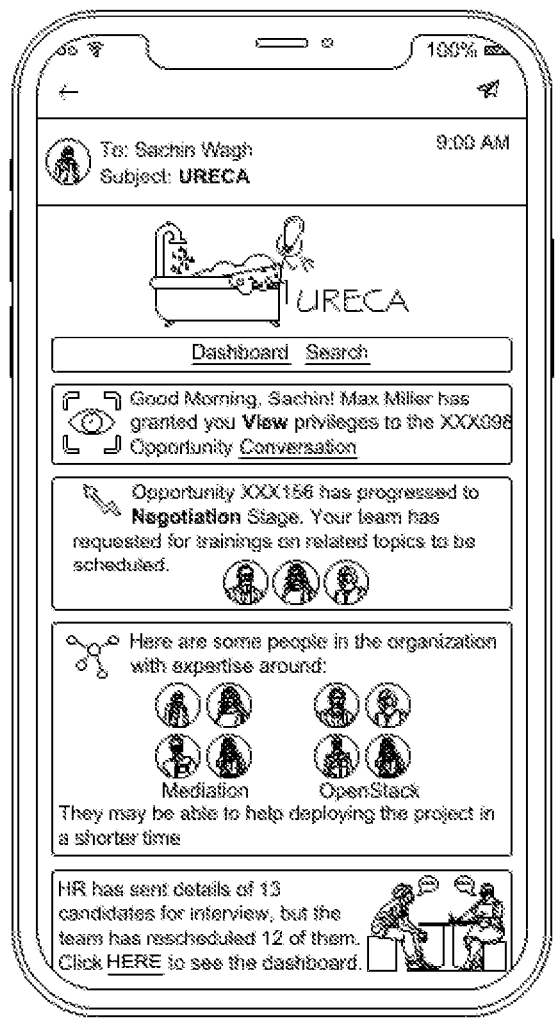

In an embodiment of the present invention, the recommendation unit 126 is configured with one or more pre-defined templates, which are employed for providing visualization of the recommendation and insights on behaviour in the form of the RAC. The pre-defined templates are reusable and are modular in nature. FIGS. 12*a*-12*c* illustrate the templates used for sending the weekly RAC and the contextual RAC to the user via electronic communication sent to the communication source unit 110. In an exemplary embodiment, FIGS. 13a-13c illustrate the weekly RAC and the contextual RAC sent to the user, using the templates illustrated in FIGS. 12a-12c, via electronic communication sent to the communication source unit 110 relating to at least, but not limited to a, 1) sales account manager, 2) human resource manager and 3) delivery manager.

In an embodiment of the present invention, the recommendation unit 126 is configured to use a combination of the templates to generate the body of each RAC for the user and add the generated RAC to a scheduled electronic communication delivery queue for that user based on the time zone of the user. Further, the recommendation unit 126 is regularly updated by the engine 104 so that a correct template is available for each recommendation type. Further, each RAC template is enabled with a single-click functionality, such that each template is suitably used for accessing the visualization unit 120 for more detailed representations.

In an embodiment of the present invention, the recommendation unit 126 receives event triggered updates from the analytics unit 130 in order to send the contextual RAC to the user based on analysis of a recently processed electronic communication data that requires an immediate response. Advantageously, event triggered communication from the analytics unit 130 aids the recommendation unit 126 in sending immediate recommendations to the users, which enables users to act upon the recommendations in a timely manner. Further, if a contextual RAC is processed over the weekend, then the recommendation unit 126 is configured to provide the contextual recommendation as part of the next weekly RAC.

In another embodiment of the present invention, the recommendation unit 126 is configured to communicate with the reporting database 128 for processing the data stored in the reporting database 128 for generating a user specific briefing message. In an embodiment of the present invention, each user specific briefing message provides one or more intelligent recommendations to the user and further the user specific briefing message is embedded with APIs in order to provide one-click change on one or more targeted information units 132 using the analytics integration module (not shown). In the event the user receives the briefing message with an intelligent recommendation from the recommendation unit 126, the user may choose to act upon the recommendation immediately or at a later date. The user receives the briefing message with an intelligent recommendation in the form of a Universal Resource Locator (URL) link.

Further, in the event the intelligent recommendation URL link is selected, an API call is triggered to the analytics unit 130 by the recommendation unit 126 which, firstly, records a timestamp associated with the selected recommendation in the recommendation tracking collection unit 1006 (FIG. 10) of the record storage unit 1002 (FIG. 10). Secondly, the analytics unit 130 triggers a subsequent API call to the respective information units 132 through the analytics integration module (not shown) by using the authentication mechanism implemented by the organization. In an embodiment of the present invention, the recommendation tracking collection unit 1006 (FIG. 10) of the record storage unit 1002 (FIG. 10) is further configured to track when a recommendation is made via the recommendation unit 126 to the user and the time taken by the user to take action on that recommendation. Thus, the recommendation tracking collection unit 1006 (FIG. 10) is continuously updated with the recommendations made via the recommendation unit 126 and the reporting database 128.

In an embodiment of the present invention, the visualization unit 120 is configured to operate in conjunction with the first repository 118, the record storage unit 122, the recommendation unit 126 and the reporting database 128. The visualization unit 120 is configured to provide an actionable User Interface (UI) with information related to, but not limited to, historical and inherited user electronic communication data, searchable conversations based on keywords and dashboards for data visualization. The visualization unit 120 is configured to provide user friendly data driven outcomes including, but are not limited to, representation of custom generated depiction of electronic communications data by inheritable chronological threads, keyword tagging based on electronic communications processed by the NLP unit 116 and providing dashboards and recommendations to deliver insights relating to non-obvious and hidden patterns in the electronic communications data by implementing AI based analytics.

Figure 14:
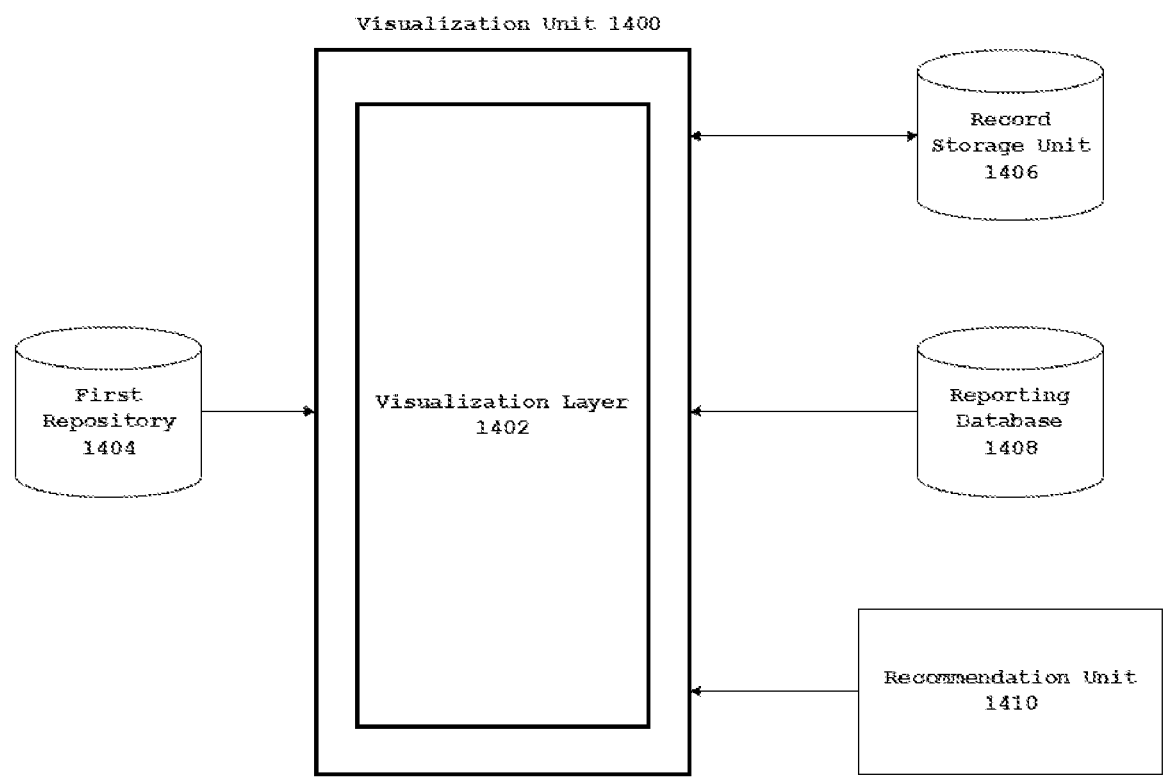
FIG. 14 illustrates a detailed block diagram of a visualization unit, in accordance with an embodiment of the present invention.
Figure 15A:
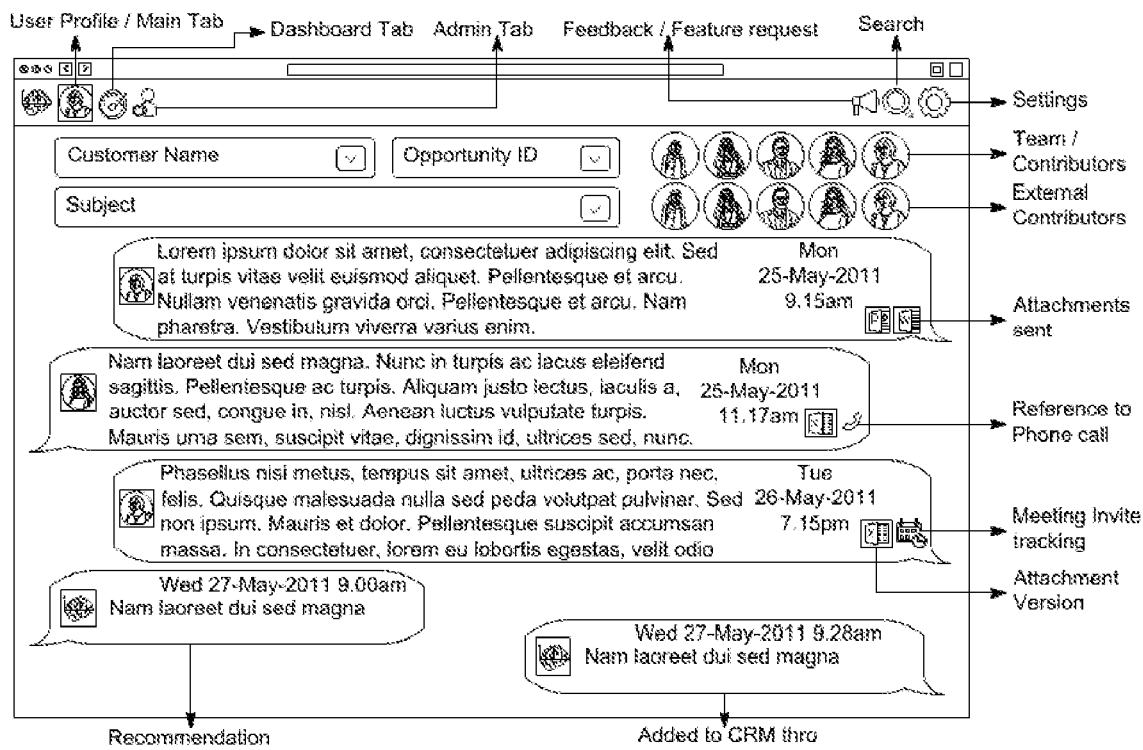
FIGS. 15a-15d illustrate screen shots of an actionable UI with dashboards for viewing data on a visualization unit, in accordance with an embodiment of the present invention.
Figure 15B:
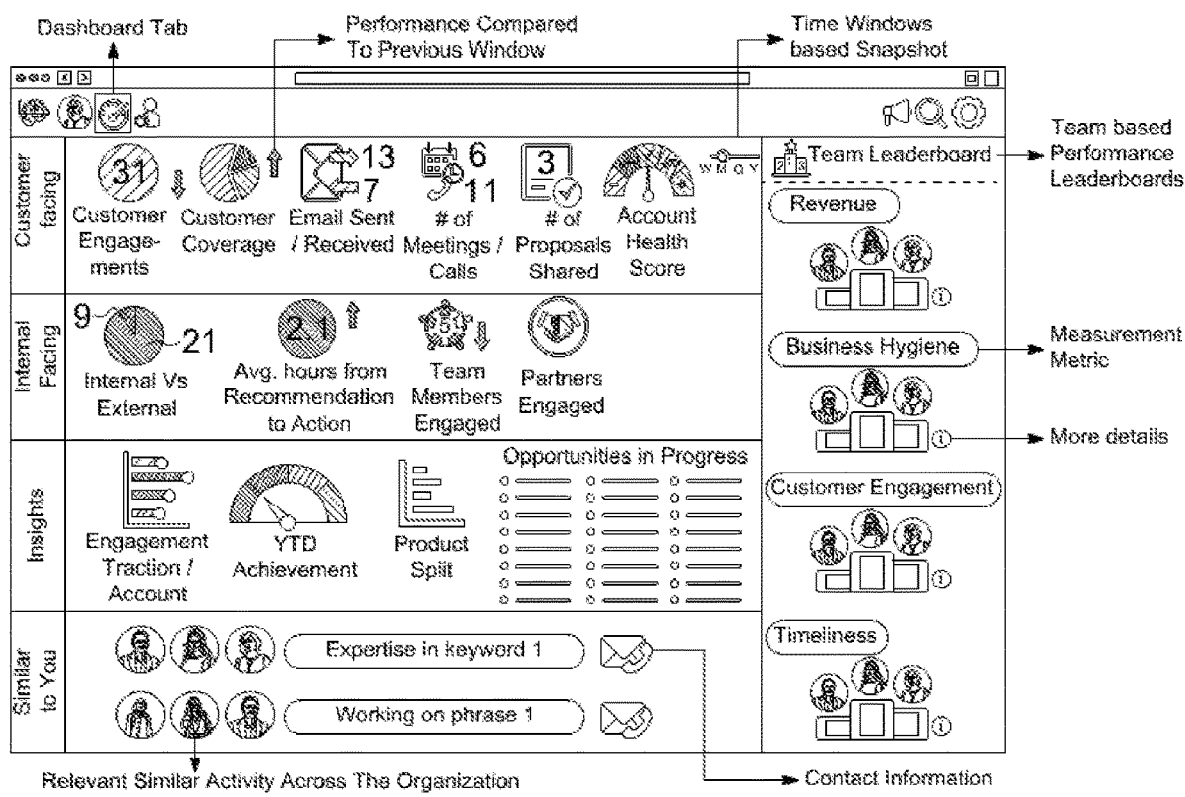
Figure 15C:
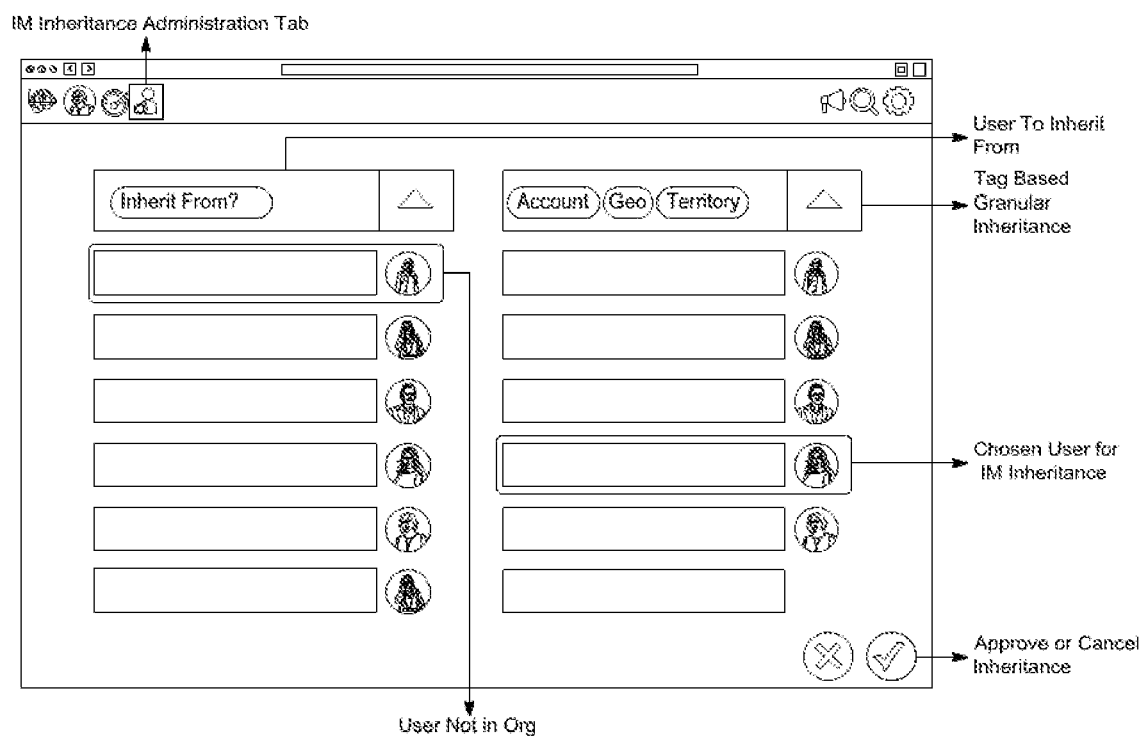
Figure 15D:
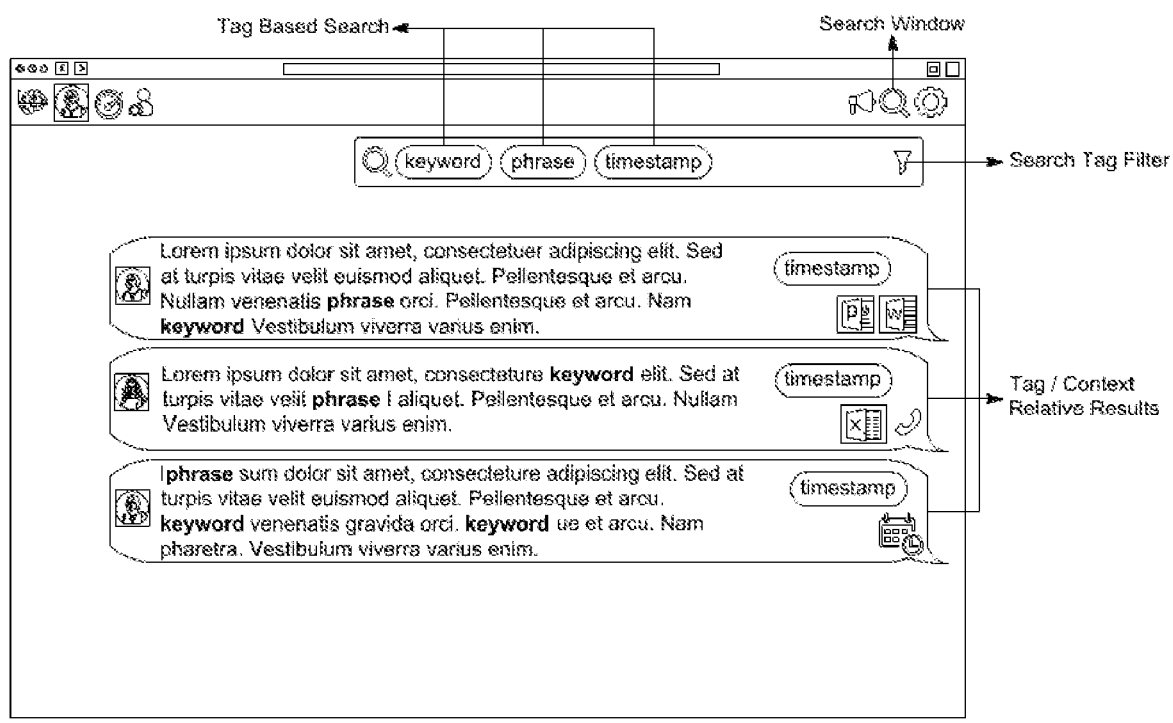

FIG. 14 illustrates a detailed block diagram of the visualization unit 1400 (120, FIG. 1). In an embodiment of the present invention, the visualization unit 1400 (120, FIG. 1) comprises a visualization layer 1402 configured to receive inputs from the first repository 1404 (118, FIG. 1), the record storage unit 1406 (122, FIG. 1), the recommendation unit 1410 (126, FIG. 1) and the reporting database 1408 (128, FIG. 1). Further, users interact with the visualization layer of the visualization unit 1400 by logging-on to the actionable UI by using corporate authentication protocols. The user may access the visualization unit 120 by clicking on an embedded link in a RAC briefing electronic communication.

In an embodiment of the present invention, the visualization layer 1402 of the visualization unit 1400 is configured to communicate with the first repository 1404 (118, FIG. 1) for processing and mapping the stored user's data and providing access to the user for data visualization using the authentication functionality. Further, the user data stored in the first repository 1404 (118, FIG. 1) which is processed and mapped by the visualization unit 1400 is in the form of an Access Control List (ACL) present within the first repository 1404 (118, FIG. 1) for each user.

In an embodiment of the present invention, the visualization layer 1402 is configured to communicate with the record storage unit 1406 (122, FIG. 1) for fetching the data stored in the sub-record storage unit 1004 (FIG. 10) based on the recommendation sent to the user via the recommendation unit 1410 (126, FIG. 1). Further, a record of the recommendation is processed as relating to the electronic communications data based on the linkages between the record storage unit 1002 (FIG. 10) and the recommendation tracking collection unit 1006 (FIG. 10). Advantageously, the linkages between the record storage unit 1002 (FIG. 10) and the recommendation tracking collection unit 1006 (FIG. 10) aids in providing a holistic and detailed view of the entire electronic communications data (including recommendations made and timelines in which they were acted upon), when the electronic communications data is transferred to the new user or the reassigned user.

In an embodiment of the present invention, the visualization layer 1402 of the visualization unit 1400 (120, FIG. 1) is configured to provide one or more intelligent features on the actionable UI by communicating with the record storage unit 1406 (122, FIG. 1). In an exemplary embodiment of the present invention, the intelligent features provide a designated authorized user (as defined by the organization), the ability to access an organized intelligent memory of user conversation threads relating to chronological electronic communications data of any former or current users based on pre-defined inheritance keywords. In another exemplary embodiment of the present invention, the intelligent features include an intelligent view of context-based electronic communication data history related to a particular keyword or event triggered by the user by using at least one of the briefing message or a search with one or more third tags. In another exemplary embodiment of the present invention, the intelligent features include widget based dashboards for empirically computing key areas of engagement and performance of the users based on analysis of electronic communication data, and displaying non-obvious data in the form of performance leader boards and similar electronic communications data of the organization which is processed by the analytics unit 130. In yet another embodiment of the present invention, the intelligent features include marking certain electronic communications data as confidential electronic communications data, which is accessed by authorized users only and not accessible to the new users or the reassigned users. In another exemplary embodiment of the present invention, the intelligent features include providing rights to the managers in the organization for transferring the previous electronic communications data, associated with the user that has left the organization, to the new user or the reassigned user such that the new user or the reassigned user have rights to view only the specific electronic communications data, based on specific criteria, of the user that has left the organization and not his/her personal electronic communications data.

FIGS. 15a-15d illustrate screen shots of the actionable UI with functionality including, but is not limited to, visual representation of intelligent memory, context based email thread, user and inheritance administration, and dashboards for data visualization provided to the user on the visualization unit 1400 (FIG. 14). In an exemplary embodiment of the present invention, the visualization layer 1402 (FIG. 14) is configured to provide data visualization based on one or more visualization categories such as, but are not limited to, bar charts, pie charts, plotlines, comparative, composite, organizational, spatial, relational, distributive, sequential and temporal. The data for viewing is rendered based on using one or more visualization tools and techniques such as, but are not limited to, PHA, python, graphana, candela, datawrapper and tableau.

Figure 16:
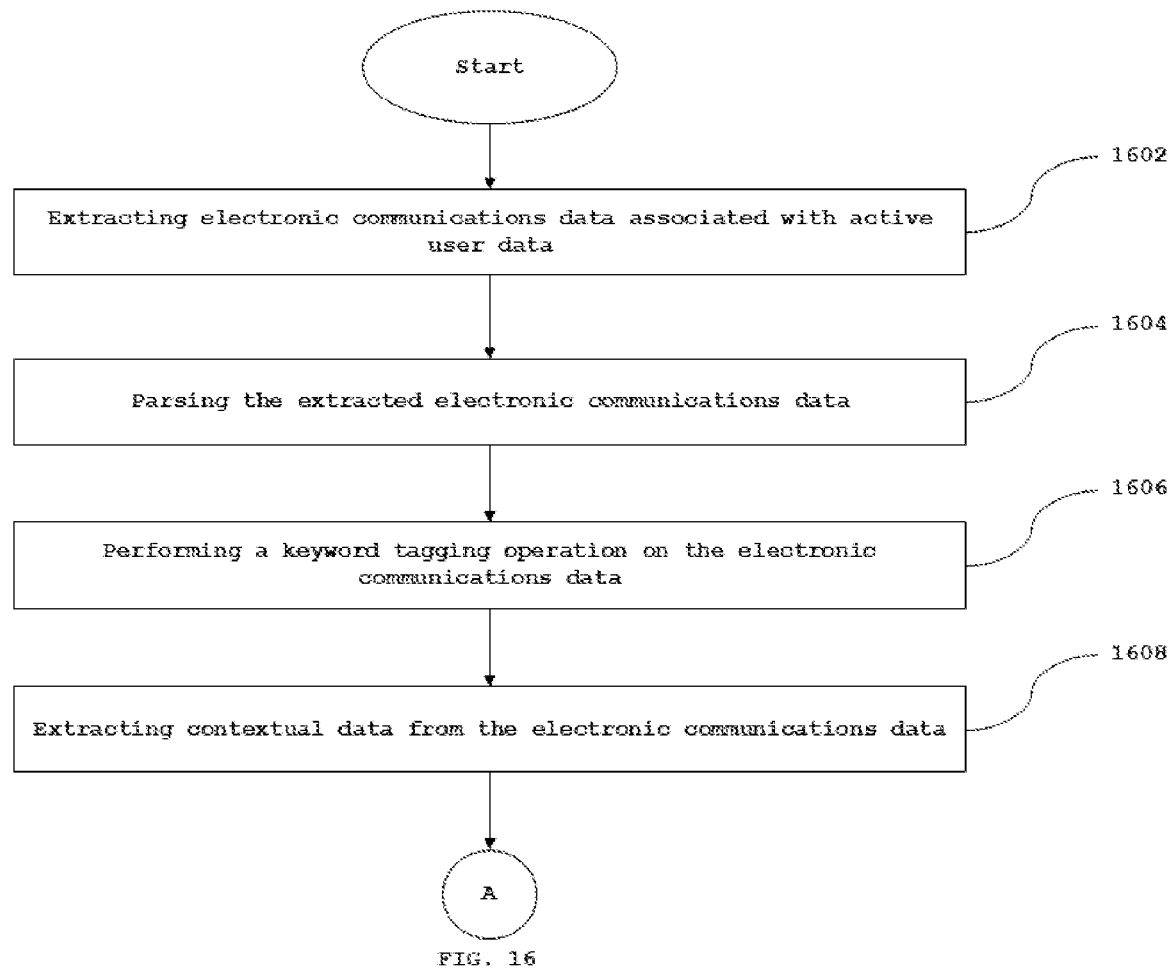
FIG. 16 illustrates a flowchart depicting a method for creating an intelligent memory and providing contextual intelligent recommendations, in accordance with an embodiment of the present invention.
Figure 16A:
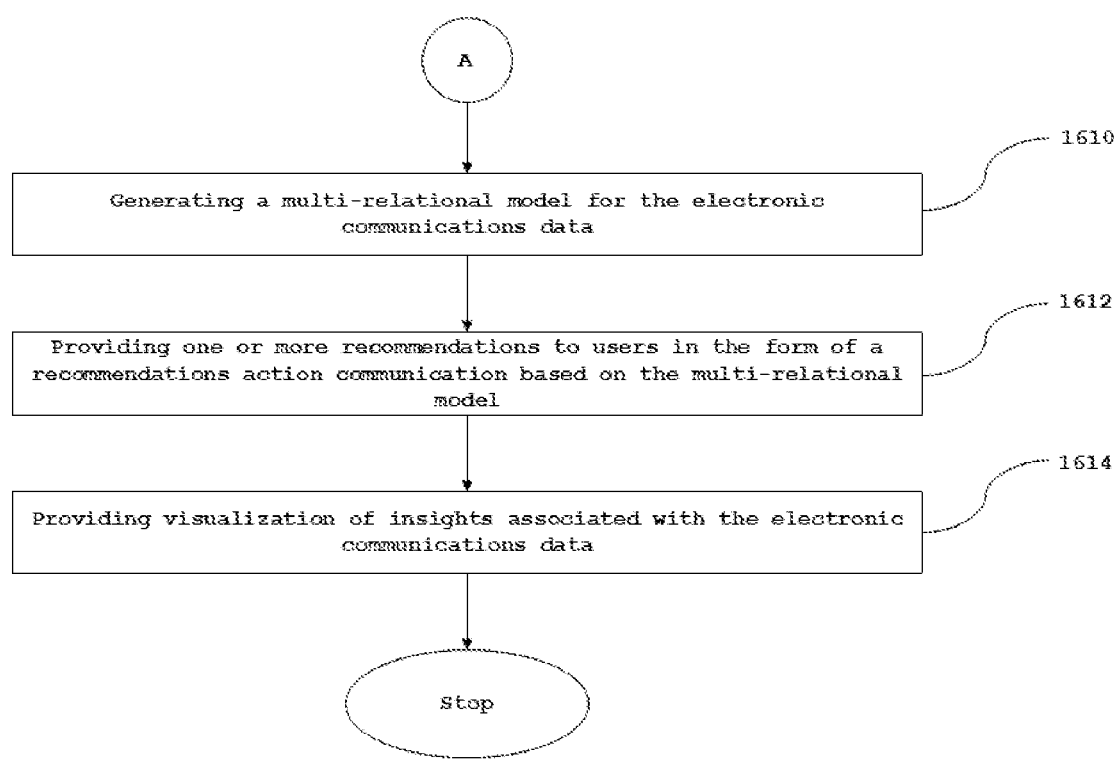

FIG. 16 illustrates a flowchart depicting a method for creating an intelligent memory and providing contextual intelligent recommendations, in accordance with an embodiment of the present invention.

At step 1602, electronic communications data associated with active user data is extracted. In an embodiment of the present invention, any changes in the user data are determined at pre-determined intervals and the user data is extracted for extracting the electronic communications data associated with the user data. In an embodiment of the present invention, a time window is set for extraction of a count data associated with the user data in a pre-defined time-period and frequency. Further, the user count data is determined based on, at least, users (i.e. the employees, contractors, etc.) that have left the organization, present users in the organization, or new users that have joined the organization on a previous day. Further, the count data determined as missing from a previous sync is flagged as 'Not Active' (NA). Further, extraction of the user data, which is flagged as 'NA', is not carried out from that day onwards. Existing or new users are flagged as 'active'.

In an embodiment of the present invention, the extracted user data is processed for comparing changes in user data since a last synch. In an embodiment of the present invention, user data with all data fields is processed. A differential comparison of each relevant field (i.e. fields mentioned in Table 1) is made for determining changes. In the event a change is determined in a data field as compared to a corresponding user data field (for e.g. change in manager, geo location, designation, etc.), then that data field is modified to ensure consistency between the user data present a storage unit and the user data present in an organization directory unit.

In an embodiment of the present invention, based on an extracted list of active users, a synch mechanism sets the appropriate time zone for each user. The synch mechanism performs the extraction at predetermined time intervals. Further, if the user has not updated his/her preferred time zone, then the synch mechanism uses a messaging source time zone settings as the preferred time zone for that user. In an embodiment of the present invention, geographical location of each user associated with the electronic communications data is extracted.

Further, the user data stored in the storage unit 216 is classified into one or more attributes, such as, but is not limited to, e-mail attributes, time attributes, geographical attributes and user attributes. E-mail attributes may include, but are not limited to, user name, given name, surname, display name and e-mail. Time attributes include, but are not limited to, user update, created date and time, last update time and previous start time. Geographical attributes include, but are not limited to, use location, country, time zone and preferred time zone. User attributes include, but are not limited to, active user, view Access Control List privileges and manager of the user.

In an exemplary embodiment of the present invention, during each sync cycle, manager related information for each user (i.e. employee) is verified and updated and a hierarchy between a manager and the user is captured. The manager related information is stored in the storage unit 216 and used for providing authorization for viewing conversation threads associated with a relevant criteria corresponding to the electronic communication of users who have left the organization or have been reassigned from the team, using a visualization portal. Further, the storage unit 216 comprises an all Access Control List (ACL) which is configured to provide rights to defined users for providing 'view' authorization to view conversation data of existing users or user who have left the organization. An administration functionality is provided via which a manager may carry out modifications in the 'view' authorization of the user who has left the organization and provides the existing or the new user with 'view' authorization for viewing conversation threads associated with the electronic communication.

In an embodiment of the present information, each user data entry in the storage unit 216 has a 'view Access Control List' (ACL) field value associated with it. The 'view ACL' field value provides for inheriting electronic communications data by a user who is not originally part of the electronic communications data. Further, the default value of 'view ACL' field value has the same value as the user ID for default access by a user only to their own electronic communications data. The storage unit 216 is configured to provide access for defined users (based on organization defined user hierarchy and permissions) to change the 'view ACL' field value for providing 'view' authorization to the existing or new users in the organization for viewing particular conversations associated with the electronic communications of the user who has left the organization (i.e. a former user) or has been reassigned. The 'view' authorization is provided to the existing or new users based on, but is not limited to, account name, territory and geographic location.

In an embodiment of the present invention, the active user data is stored for determining which users are currently active and whose communication data needs to be extracted for further processing. A user is considered active if at least the user is listed as currently employed with the organization or has an active entry in the organization directory unit. Further, an exclusion list of users (as defined by the organization) is maintained whose communication data needs to be excluded from being extracted. In an embodiment of the present invention, prior to scheduling the user communication data extraction, a check is carried out and it is determined whether the user is in the exclusion list or not.

In an exemplary embodiment of the present invention, if the user data is in the exclusion list or the user data is not currently active or the user is not in the current time zone, then extraction of the said user's communication data is not scheduled. In another exemplary embodiment of the present invention, if the user data is not in the exclusion list and the user data is currently active and the user data is in the current time zone, then the user data is transmitted for queuing. In another exemplary embodiment of the present invention, a distributed event streaming platform is used to ensure that all users scheduled for electronic communication data extraction are maintained in a secure and scalable queue. This queue aids to process only the selected users in the queue based on the order in which the users were added to the queue.

In an embodiment of the present invention, user data is organized for extraction of associated electronic communications data present in a defined order. In an embodiment of the present invention, authentication techniques are employed for authenticating and authorizing for accessing and extracting electronic communications data. In an exemplary embodiment of the present invention, if a Single Sign-On (SSO) functionality is implemented, then one or more defined SSO tokens are used for authentication and providing read access to the electronic communications data. In an embodiment of the present invention, active user data is selected in a particular time zone at pre-defined time intervals (e.g. 30-minute intervals) so as to cover all time zones and subsequently electronic communications data (e.g. e-mails) sent or received during the previous calendar day (e.g. data in mailboxes) in that time zone are extracted. Thereafter, the selected user data is queued, using an event notification queue, for extraction of electronic communications data for the scheduled users.

In an embodiment of the present invention, extraction of active user data is scheduled for extracting electronic communication data associated with the user data. A check is performed at a pre-defined time interval (e.g. every 30 minutes) for determining whether users are available for that specific time zone for electronic communications data extraction. Further, a check is performed to determine whether users have been added in the exclusion list or if the users have been classified as inactive since a last extraction before processing the user data for extraction.

In an embodiment of the present invention, electronic communications data associated with the user data queued for extraction is extracted. Electronic communications data is extracted for processing by selected users in a user notification queue. Each individual user communication data is parsed and the individual user communication data is compared with previously parsed communication information stored based on unique identifiers (for e.g., message ID, time stamp, origin, etc.). In the event, a user communication has already been processed, then a valid unique identifier is returned as evidence for the processed and stored communications data. Any further processing of that user communications data is stopped and the next user communications data is processed. Further, the user data is processed based on a multithreaded implementation for the active user for extracting the electronic communications data. Subsequent to the extraction of the electronic communications data, the extracted electronic communications data is provided to a NLP event notification service 408. Further, the NLP event notification service 408 is executed by queue operations such as, but are not limited to, the Java Management Extensions (JMX) and the Kafka. In an embodiment of the present invention, date and time-period of a last extraction of the electronic communication data is continuously tracked.

In an embodiment of the present invention, the extracted active user data is received by the user notification queue and a message processing thread of message parser selects a user from the user notification queue for processing. The message processing thread of the message parser performs a check to determine whether the user data is being processed for the first time. Further, if the user data is determined to be processed for the first time, then it is checked whether that user data associated with the electronic communication is an existing user data and whether the user data requires historical data extraction. In an embodiment of the present invention, in an initial implementation, the message parser is configured to extract the historical electronic communications data based on a pre-configured maximum age of electronic communications data (e.g. electronic communications data from last two years).

At step 1604, the extracted electronic communications data is parsed. In an embodiment of the present invention, the electronic communications data for each user is parsed by the message parser from a last parsed date to a previous day of extraction of the electronic communications data. Further, for past electronic communications data, if it is determined that the number of days of electronic communications data to be extracted is greater than user joining date or exceeds the date of electronic communications data extraction for a maximum time period (e.g. 2 years), then the last electronic communications data to be processed is taken from the date of joining of the user or from the maximum time period. For example, in the initial implementation, if a 60-day cycle is implemented for historical electronic communications data extraction and the last cycle reaches a defined parameter, such as, but not limited to, an employee date of joining or the organization defining maximum extraction period of 2 years, then the extraction of electronic communications data for that user stops and the defined parameter is marked as a start date from which the electronic communications data associated with the user is available.

In an embodiment of the present invention, the message parser extracts electronic communications data for selected users for processing from a user notification queue. The message parser performs the electronic communications data extraction based on at least the time zone associated with the user, the time zone preferred by the user or time zone set by the organization's administrator for the user. User data is accessed for carrying out electronic communications data extraction for the particular user. The extracted list of active user is provided to the user notification queue. Further, each thread of the message parser is configured to select an active user from the user notification queue and electronic communications data associated with the selected active user is extracted. Further, subsequent to completion of processing of each electronic communications data associated with the selected active user, the processed electronic communications data is converted to a custom record format by the message parser for storage. In an exemplary embodiment of the present invention, storage of the processed electronic communications data is carried out using at least a custom JavaScript Object Notation (JSON) format, object store format, or a Graph format. The custom record format is then added to the notification NLP queue for processing and subsequently stored.

The message parser analyses each electronic communications data and determines whether the electronic communications data is at least a calendar invite or a regular message. Further, if the electronic communications data is a calendar invite, then the electronic communications data is processed in the form of a calendar to determine an invite flow by identifying one or more variations associated with the calendar such as, but is not limited to, details of a calendar invite (such as, sender, time, duration, attendees, communication channel, etc.), a calendar response (such as, accept, decline or tentative) and a calendar cancellation. Further, if the electronic communications data is the regular message, then the message parser processes the body and attachment (if any) of the regular message. The attachment is stored after carrying out a deduplication process. In an exemplary embodiment of the present invention, the deduplication process of attachment is carried out based on a SHA hash 256 or similar technique. Further, if the attachment already exists, then a key of the attachment is retrieved and subsequently updated in the custom record.

In an embodiment of the present invention, a check is performed for determining duplication of the electronic communications data, i.e. whether the electronic communications data has been processed or not, by checking whether an electronic communications data ID exist or not. If the electronic communications data ID exists, then the electronic communications data is not processed or stored. Therefore, the message parser is configured to process and store only unique electronic communications data using the custom format and identify identical extracted electronic communications data which may be associated with multiple users to reject duplicate electronic communications data from being stored, thereby significantly reducing the storage space required. In an exemplary embodiment of the present invention, the duplicate parsed header and subject, duplicate parsed body of the conversation data associated with the electronic communications data and the duplicate attached documents, referred to as duplicate data, are analyzed and removed based on a deduplication (DeDupe) check process prior to storage. Further, if a response to the electronic communications data is identified as having references to inline electronic communications data replies, then the entire electronic communications data is captured in the custom format. Further, each processed electronic communications data in custom format is transmitted to the notification NLP queue for further processing and subsequently stored.

At step 1606, a keyword tagging operation is performed on the electronic communications data. In an embodiment of the present invention, a keyword tagging operation is carried out on the custom record formatted electronic communications data. The conversation data associated with the electronic communications data is parsed and one or more relevant keywords are searched in the conversation data associated with the electronic communications data. Further, tagging of the keywords in the electronic communications data is based on a pre-generated keywords map, referred to as a pilot dictionary, to process such keywords.

In an embodiment of the present invention, the parsed data is processed for extraction of the keywords. The parsed data is provided based on the NLP event notification queue. In an exemplary embodiment of the present invention, the pilot dictionary comprises natural language words and phrases which are of relevance to the organization. The pilot dictionary is generated based on a learning process during the initial deployment phase. The pilot dictionary is used to parse an initial electronic communications data in order to develop a Natural Language (NL) vocabulary which is specific to the organization. Further, the developed NL vocabulary is used to analyze the natural language associated with the future electronic communications. The NL vocabulary is fine-tuned based on one or more NL datasets associated with the initial electronic communications data of an organization. In an embodiment of the present invention, the development of the NL vocabulary is an iterative process performed during the initial deployment of the solution. A first iteration is carried out for identifying stored electronic communications data in order to train the pilot dictionary data set from the stored electronic communications data for developing the NL vocabulary. Further, in subsequent iterations, a relationship is established with the stored electronic communications data based on 1-$n^{th}$ level of transitivity. The iterations are customizable based on one or more development parameters associated with the NL vocabulary.

In an embodiment of the present invention, subsequent to development of the NL vocabulary, the stored electronic communications data is further parsed for converting the stored electronic communications data into one or more detailed electronic communications data records. In an embodiment of the present invention, for identifying the keywords in incoming electronic communications data the developed NL vocabulary is employed and are subsequently saved in the detailed electronic communications data records. The stored keywords are used for further processing. Further, the identified keywords are appended to the respective detailed electronic communications data records.

In an embodiment of the present invention, each of the parsed electronic communications data is analyzed to determine a relevance to the organization. In an exemplary embodiment of the present invention, an initial dictionary (i.e. the pilot dictionary) is used to ascertain the context and relevance of each conversation that is parsed for the organization. The context and relevance is determined based on weights, repetitions and functionality associated with the electronic communications. During initial deployment of the pilot dictionary, a sample set (for example, 500,000 communications) is split into a 4:1 ratio for dictionary training and testing. Further, during the initial deployment of the pilot dictionary, the output for the sample set is directly stored, in a custom format, instead of being sent to the NLP event notification queue. Each communication in this initial communication set is analyzed for context and relevance with the pilot dictionary. Each keyword is determined as relevant based on the presence of one or more words from the pilot dictionary and each relevant word is further added to the pilot dictionary for use in subsequent conversation analysis.

Further, keywords corresponding to an entity associated with the electronic communications data are stored as a first tag for each electronic communications data in a custom record format. Examples of keywords include, but are not limited to, sender name, customer domain, and timestamp. The tags are processed for analysis and for providing enhanced access control and search capabilities.

In an embodiment of the present invention, subsequent to analysis of the initial electronic communications data, the pilot dictionary is considered as the main dictionary for all further analysis for determining context and relevance from all subsequent electronic communications. Each electronic communications data from the initial electronic communications data is analyzed using the pilot dictionary and each keyword corresponding to the analyzed electronic communications data is stored as a second tag in the custom formatted record for that electronic communication. Further, all subsequent electronic communications (beyond the initial communication set) are processed and passed to the NLP event notification queue for further processing.

At step 1608, contextual data is extracted from the electronic communications data. In an embodiment of the present invention, the electronic communication data is pre-processed by cleaning the electronic communications data to reduce noise in the electronic communications data, tokenizing the content in the electronic communications data, implementing a lemmatization operation for reducing the words to their root form, and selectively learning from the electronic communications data for extracting contextual and relevant data from the electronic communications data. Consequently, understanding of language associated with the electronic communications data is refined, thereby improving the pilot dictionary.

In particular, in embodiment of the present invention, the electronic communications data is cleaned to remove standard communication artifacts such as, but not limited to, punctuations, and other content that may lack relevance. The cleaned data is thereafter tokenized. Keywords found relevant are added to the pilot dictionary as part of the dictionary improvement process.

In an embodiment of the present invention, the nature of the entity associated with the electronic communications data is analyzed. In an exemplary embodiment of the present invention, context and relevance based on keyword recurrence, weights, repetitions and functionality associated with the electronic communications is analyzed. The pre-processed parsed data is analyzed in order to carry out a recognition operation between entities associated with the electronic communications data and context present in the electronic communications data associated with the parsed electronic communications data for distinguishing between the entities and the context. The recognition operation between the entities and the context in the electronic communications data is carried out based on a semantic analysis of the parsed electronic communications data. The recognition operation for context is further carried out based on assimilated learning techniques in addition to carrying out of the semantic operation. In an embodiment of the present invention, a text and a hypothesis semantic graph is generated, which is a structured linguistic representation comprising information related to semantic electronic communications data. The semantic graphs are generated based on typed dependency graphs, in which each node is a word and labelled edges represent grammatical relations between the words. A semantic graph for a sentence contains a node for each word of the sentence, each node being embedded with metadata generated by a toolkit of linguistic processing tools, including, but not limited to, word lemmas, parts of speech and named entity recognition. This data is processed to improve the pilot dictionary. In an embodiment of the present invention, the electronic communications data is used to further determine and establish relationships with the other electronic communications data analyzed using machine learning algorithms such as, but not limited to, neural networks technique.

In an embodiment of the present invention, output of the semantic operation and the assimilated learning techniques is used to further process the parsed electronic communications data, and determine relationships between the tags associated with the parsed electronic communications data. Thereafter a score is generated for each relationship. Post analysis, the determined keywords, their corresponding lemma and the relevance based on keyword recurrence, weights, repetitions and functionality associated with the electronic communications are added to the custom record format of the corresponding electronic communication.

In an embodiment of the present invention, an input as a parsed electronic communications data including conversation parameters of the electronic communications data comprising, a parsed header, subject, a parsed body of the conversations data associated with the electronic communications data along with attached documents present (if any) and analyzed conversations data is stored in a custom format for future retrieval. Further, only a single copy of the data is stored as the electronic communication data object in order to avoid duplication.

At step 1610, a multi-relational model is generated for the electronic communications data. In an embodiment of the present invention, behavioural patterns of a user associated by the electronic communications data are determined by carrying out analysis of the stored electronic communications data. A multi-relational model is generated by processing electronic communications data based on syntax and electronic communications data object. The multi-relational model provides relationship of the electronic communications data with other stored electronic communications data. For example, a user communication can be in the form of an email to a customer and a few colleagues with an attachment for a product sales proposal. Each email represents an independent entity with distinct relationships to multiple users including, but not limited to, one sender and multiple recipients, multiple attachments, one or more customers, an opportunity, etc. as well as distinct properties including, but not limited to, timestamp, subject, etc. Similarly, every single email conversation has similar relationships which contributes to the multi-relationship model. These attributes, relationships and properties are used to build a relational view for the user and similar users in the organization.

In an embodiment of the present invention, relevance of the keywords, stored as data, is determined with respect to the electronic communications data. Based on the relevant keywords and the keywords stored as the first and the second tag, a querying model is generated. The querying model represents conversation data associated with the electronic communications data in the form of graph nodes (or similar), thereby providing the multi-relational model. The querying model comprising various nodes which communicate with each other.

In an example, a user node has a one-to-one relationship with an electronic communication node when the user is a sender. The electronic communication node has a one-to-many relationship with many recipient user nodes. Further, each electronic communication node has a one-to-one relationship with said electronic communications body and header nodes, and has a one-to-many relationship with any of the attachment nodes that may have been a part of that electronic communication as well as all the keyword nodes which are associated with the electronic communication.

Behavioural patterns associated with the stored data is determined based on the querying model. Types, frequencies and strength of the electronic communications data is analyzed between users within the organization and outside the organization. Cross-references between electronic communications data comprising specific keywords is analyzed.

In an embodiment of the present invention, neural network techniques are used for continuously determining existing relationships, new relationships and undefined behaviour patterns between the stored data. In an embodiment of the present invention, an inductive neural network technique including, but is not limited to, a GraphSAGE technique is employed on the querying model for continuously determining existing relationships, new relationships and undefined behaviour patterns associated with the stored data. The node embeddings are computed for unseen nodes or relationships in the querying model using multiple techniques for continuously determining new relationships and undefined behaviour patterns associated with the stored data. The computing process involves a constant learning of a function for generating node embeddings by understanding neighbouring nodes and properties associated with the nodes. Computing node embeddings for unseen nodes or relationships in the querying model aids in effective and time efficient determination of the existing relationships, new relationships and undefined behavioural patterns associated with the stored data.

In an embodiment of the present invention, the determined behavioural patterns associated with the electronic communications data are stored for each user. In an exemplary embodiment of the present invention, user behavioural patterns are aggregated to provide a weekly view, a monthly view, a quarterly view, an annual view as well as a custom timeline view. The stored behavioural patterns are visualized in a time bound comparison, e.g. a week-over-week, custom time windows, etc.

At step 1612, one or more recommendations are provided to users in the form of a recommendations action communication (RAC) based on the multi-relational model. In an embodiment of the present invention, the recommendations represent electronic communication related actionable suggestions including, but are not limited to, a regular message or calendar invite, which the user may have missed responding to for 2 days, a follow-up with a customer on an electronic communication sent by the user, sending a pointer to another user in the organization working on a similar project or a solution or a technology reference in the user's electronic communications sent in a previous day. In another exemplary embodiment of the present invention, the recommendations may include updating status of an opportunity in a CRM. The time period of sending recommendations depends on the inputs and criticality of the recommendation.

In an embodiment of the present invention, the recommendations are sent in the form of an electronic Recommendation Action communication (RAC) based on the multi-relational model. The RAC includes embedded API calls for taking a suitable action on information units with a single click. In an exemplary embodiment of the present invention, the information units include, but are not limited to, a Human Resource Management System (HRMS) and a Customer Relationship Management (CRM) system. In another exemplary embodiment of the present invention, during analysis of the stored data, if a state change of the stored data (e.g. sending out of a proposal by a user) is detected, then a current state of the stored data is verified prior to making the recommendation of changes for updating in the information units (e.g. the current state in the information units 132 is 'qualification'). Further, one or more API call based enquiries are generated and sent to the information units for recommendation of changes and updating the information units. In the event, the current state of the stored data is identical to the proposed change, then the updates in the information units is ignored. Further, if the current state is incorrect (e.g. the current state is 'qualification' and the recommended change in state is 'proposal'), then the current state and the recommended change is retrieved and stored for future retrieval.

In an embodiment of the present invention, the RAC may be a contextual or a periodic electronic communication comprising at least recommended action in the form of recommendation, collaboration suggestions, data on performance and behaviour of each user in the organization. In an embodiment of the present invention, the RAC is scheduled based on communicating with a reporting database and processing the data stored in the reporting database. In an embodiment of the present invention, the weekly RAC is scheduled at a pre-determined time to all the users in a particular time zone. Further, the contextual RAC is sent based on availability of the analysis of the user's most recent electronic communications, thereby providing faster responses to users with better insights. Further, the timeline for the action on the recommendation and the type of response is recorded using APIs embedded in the RAC. The weekly RAC and the contextual RAC may be sent to the user in the form of pictorial and textual stories in electronic communications, which can also be visualized in greater detail by the user.

In an embodiment of the present invention, one or more pre-defined templates are configured, which are employed for providing visualization of the recommendation and insights on behaviour in the form of the RAC. The pre-defined templates are reusable and are modular in nature. In an embodiment of the present invention, a combination of the templates is used to generate the body of each RAC for the user and the generated RAC is added to a scheduled electronic communication delivery queue for that user based on the time zone of the user. Further, each RAC template is enabled with a single-click functionality, such that each template is suitably used for accessing more detailed representations.

At step 1614, visualization of insights associated with the electronic communications data is provided. In an embodiment of the present invention, an actionable User Interface (UI) is provided with information related to, but not limited to, historical and inherited user electronic communication data, searchable conversations based on keywords and dashboards for data visualization. User friendly data driven outcomes are provided including, but are not limited to, representation of custom generated depiction of electronic communications data by user inheritable chronological threads, keyword tagging based on processed electronic communications, and providing dashboards and recommendations to deliver insights relating to non-obvious and hidden patterns in the electronic communications data by implementing AI based analytics.

In an embodiment of the present invention, one or more intelligent features are provided on the actionable UI. In an exemplary embodiment of the present invention, the intelligent features provide a designated authorized user (as defined by the organization), the ability to access an organized intelligent memory of user conversation threads relating to chronological electronic communications data of any former or current users based on pre-defined inheritance keywords. Further, the actionable UI provides functionality including, but is not limited to, visual representation of intelligent memory, context based email thread, user and inheritance administration, and dashboards for data visualization provided to the user. In an exemplary embodiment of the present invention, data visualization is provided based on one or more visualization categories such as, but are not limited to, bar charts, pie charts, plotlines, comparative, composite, organizational, spatial, relational, distributive, sequential and temporal. The data for viewing is rendered using one or more visualization tools and techniques such as, but are not limited to, PHA, python, graphana, candela, datawrapper and tableau.

Advantageously, in various embodiments of the present invention, the system 100 provides optimized interlinking of data in an electronic communication for creating the intelligent memory by efficiently parsing electronic communications data. An organization specific vocabulary is developed and relevant conversations in electronic communications data is tagged by using natural language processing and neural network techniques. The present invention further provides for long-term storage of user electronic communication data as history. The present invention provides for conversations data history to be made available to authorized users to view conversations of former or current users based on 'view' access rights. Further, the present invention provides for adequate navigation and linkages between the conversation data associated with a user's electronic communications even after the user involved in the communication has left the organization. The present invention provides for parsing electronic communications data for continuous long-term analysis and for providing intelligent recommendations. The present invention provides for efficient processing and analysis of the electronic communications data. The present invention provides for automated insights on similar electronic communications by determining behavioral patterns of users. Further, the present invention provides for retention of only unique user communication data by avoiding storage of duplicate conversation data for efficient storage of conversation data and search operations. Furthermore, the present invention provides for appropriately determining correlations between similar actionable intelligent data associated with the electronic communications. Yet further, the present invention provides for determining and tracking changes made to any document shared as attachment along with the conversations data associated with the electronic communications. The present invention further provides for intelligent visualization of, but not limited to, intelligent memory conversation, conversation inheritance, context based conversations, keyword based search capabilities, user and conversation inheritance management, and dashboards via an actionable User Interface (UI).

Figure 17:
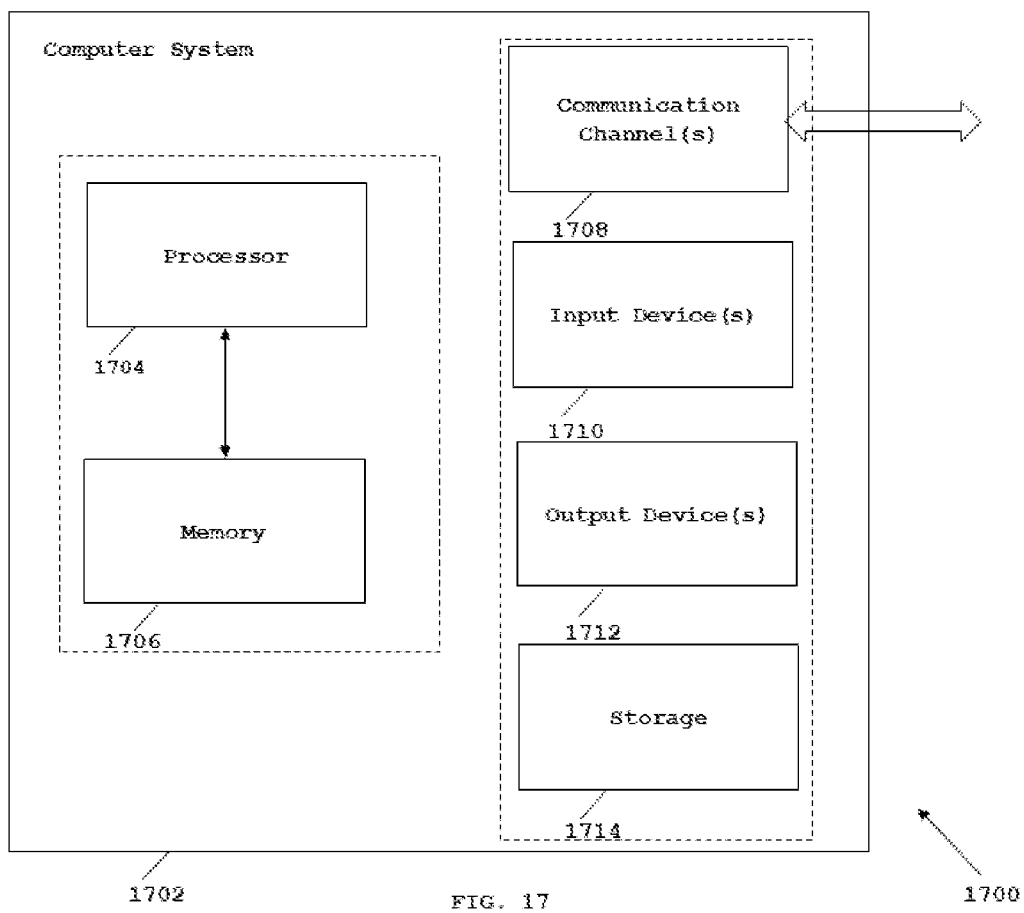
FIG. 17 illustrates an exemplary computer system in which various embodiments of the present invention may be implemented.

FIG. 17 illustrates an exemplary computer system in which various embodiments of the present invention may be implemented. The computer system 1702 comprises a processor 1704 (106, FIG. 1) and a memory 1706 (108, FIG. 1). The processor 1704 (106, FIG. 1) executes program instructions and is a real processor. The computer system 1702 is not intended to suggest any limitation as to scope of use or functionality of described embodiments. For example, the computer system 1702 may include, but not limited to, a programmed microprocessor, a micro-controller, a peripheral integrated circuit element, and other devices or arrangements of devices that are capable of implementing the steps that constitute the method of the present invention. In an embodiment of the present invention, the memory 1706 (108, FIG. 1) may store software for implementing various embodiments of the present invention. The computer system 1702 may have additional components. For example, the computer system 1702 includes one or more communication channels 1708, one or more input devices 1710, one or more output devices 1712, and storage 1714. An interconnection mechanism (not shown) such as a bus, controller, or network, interconnects the components of the computer system 1702. In various embodiments of the present invention, operating system software (not shown) provides an operating environment for various softwares executing in the computer system 1702, and manages different functionalities of the components of the computer system 1702.

The communication channel(s) 1708 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth or other transmission media.

The input device(s) 1710 may include, but not limited to, a keyboard, mouse, pen, joystick, trackball, a voice device, a scanning device, touch screen or any another device that is capable of providing input to the computer system 1702. In an embodiment of the present invention, the input device(s) 1710 may be a sound card or similar device that accepts audio input in analog or digital form. The output device(s) 1712 may include, but not limited to, a user interface on CRT or LCD, printer, speaker, CD/DVD writer, or any other device that provides output from the computer system 1702.

The storage 1714 may include, but not limited to, magnetic disks, magnetic tapes, CD-ROMs, CD-RWs, DVDs, flash drives or any other medium which can be used to store information and can be accessed by the computer system 1702. In various embodiments of the present invention, the storage 1714 contains program instructions for implementing the described embodiments.

The present invention may suitably be embodied as a computer program product for use with the computer system 1702. The method described herein is typically implemented as a computer program product, comprising a set of program instructions which is executed by the computer system 1702 or any other similar device. The set of program instructions may be a series of computer readable codes stored on a tangible medium, such as a computer readable storage medium (storage 1714), for example, diskette, CD-ROM, ROM, flash drives or hard disk, or transmittable to the computer system 1702, via a modem or other interface device, over either a tangible medium, including but not limited to optical or analogue communications channel(s) 1708. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the scope of the invention.

We claim:

1. A system for creating an intelligent memory and providing contextual intelligent recommendations, the system comprising:
   a memory storing program instructions; and
   a processor executing the program instructions stored in the memory, wherein executing the program instructions causes the processor to execute;
   an intelligent memory generation engine, the intelligent memory generation engine configured to:
      extract electronic communications data corresponding to multiple active users queued for extracting by a scheduler queue unit, wherein the extraction is performed based on at least a time zone associated with the user, the time zone preferred by the user or time zone set by an administrator for the user;
      perform a keyword tagging operation on the extracted electronic communications data, the keyword tagging operation comprising storing one or more keywords corresponding to one or more entities associated with the electronic communications data as a first tag in a record storage unit, and storing one or more keywords corresponding to conversation data associated with the extracted electronic communications data as a second tag in the record storage unit;
      generate a multi-relational model representative of the conversation data associated with the electronic communications data and other data stored in a sub-record storage unit of the record storage unit in the form of graph nodes based on the first tag and the second tag, the multi-relational model comprising node embeddings which are computed for unseen nodes representing unseen relationships between the extracted electronic communications data and the other data, wherein the node embeddings are computed by determining new relationships and undefined behaviour patterns between the extracted electronic communications data and the other data by identifying functions based on properties associated with neighbouring nodes in the graph nodes, the neighbouring nodes including nodes associated with predetermined users and former users who have left an organization or have been reassigned within the organization and are not a sender or receiver of the conversation data; and
      transmit one or more electronic Recommendation Action Communication (RAC) with embedded application program interface calls based on the multi-relational model, the embedded application program interface calls enabling actions to be taken on information units via a single click, wherein a user specific briefing message is generated by processing data stored in a reporting database for providing one or more intelligent recommendations, the briefing message is in the form of a Universal Resource Locator (URL) link, and wherein an application programming interface call is triggered, upon selection of the URL, which records a timestamp associated with the user specific briefing message and a subsequent application programming interface call is triggered to the information units by an employing authentication mechanism.

2. The system as claimed in claim 1, wherein the electronic communications data is associated with active user data, and wherein the intelligent memory generation engine comprises a first repository configured to connect with an organization directory unit via an extraction service unit at pre-determined intervals for determining any changes in the active user data stored in an active user list unit, the active user data is extracted for a predefined number of days along with geographical location of each user and are flagged as 'active' by the extraction service unit, and wherein the first repository comprises a repository synch scheduler unit which is configured to communicate with the extraction service unit for controlling and scheduling the active user data extraction from the organization directory unit.

3. The system as claimed in claim 2, wherein the first repository comprises a comparison service unit which receives the extracted active user data from the extraction service unit for comparing changes since a last synch, and wherein in the event a change is determined in a data field of the extracted active user data in relation to a corresponding data field in a storage unit in the first repository then the comparison service unit modifies that data field in the storage unit, wherein each user data entry in the storage unit has a 'view Access Control List' (ACL) field value accessible to the pre-determined users to provide 'view' authorization to the existing or new users for viewing inherited conversation threads associated with electronic communications data of the existing or the new users or the former users who have left the organization or have been reassigned.

4. The system as claimed in claim 2, wherein the intelligent memory generation engine comprises a scheduler queue unit configured to schedule extraction of the electronic communications data of the active users from a communication source unit, and wherein the scheduler queue unit is configured to communicate with an exclusion list unit in the first repository prior to scheduling the extraction for determining presence of user data corresponding to the electronic communications data in an exclusion list in the exclusion list unit.

5. The system as claimed in claim 4, wherein the scheduler queue unit schedules extraction of the electronic communications data if it is determined that the user data is not in an exclusion list and is currently active and is in the current time zone.

6. The system as claimed in claim 1, wherein the intelligent memory generation engine comprises a parsing unit, and the extraction of the electronic communications data queued for extraction is performed by the parsing unit; and
   wherein the parsing unit continuously tracks date and time period associated with a last extraction of the electronic communication data and parses the extracted electronic communications data from a last parsed date to a previous day of extraction of the electronic communications data.

7. The system as claimed in claim 6, wherein the record storage unit returns a valid unique identifier in the event the electronic communication data has already been processed by the parser unit, and wherein the parsing unit stops processing of that electronic communications data and proceeds to the next electronic communications data.

8. The system as claimed in claim 6, wherein the parsing unit is configured to process the electronic communications data based on a multithreaded implementation of message parsers for the active users in the scheduler queue unit for extracting the electronic communication data, and wherein subsequent to extraction of the electronic communications data the parsing unit is configured to provide the extracted electronic communications data to a NLP event notification service of a Natural Language Processing (NLP) unit in the intelligent memory generation engine.

9. The system as claimed in claim 8, wherein the message parser is configured to extract the electronic communications data from a user notification queue provided by a parser scheduler in the scheduler queue unit.

10. The system as claimed in claim 6, wherein the parsing unit analyzes and removes a duplicate parsed header and subject from the extracted electronic communications data, a duplicate parsed body of the conversations data associated with the electronic communications data and duplicate attached documents based on a deduplication (DeDupe) check process prior to transmitting to the record storage unit, and wherein the parsing unit captures the electronic communications data in a custom format if a response to the electronic communications data is identified as having references to inline electronic communications data replies.

11. The system as claimed in claim 8, wherein the NLP unit is configured to perform the keyword tagging operation on a custom record formatted electronic communications data in a notification NLP queue, and wherein the NLP unit is configured to parse the conversation data associated with the electronic communications data and search for one or more relevant keywords in the conversation data.

12. The system as claimed in claim 8, wherein the NLP unit comprises keywords map which is a pilot dictionary comprising natural language words and phrases, the keywords map is updated with contextual data associated with the conversation data present in the extracted electronic communication data, and wherein the NLP unit is configured to use the pilot dictionary to parse an initial electronic communications data specific to the organization in order to develop a Natural Language (NL) vocabulary, and wherein the NL vocabulary is fine-tuned based on one or more NL datasets stored in the record storage unit.

13. The system as claimed in claim 12, wherein the NLP unit is configured to carry out a first iteration for identifying electronic communications data stored within the record storage unit in order to train the pilot dictionary for developing the NL vocabulary, the NLP unit splits a sample set of electronic communications data, during initial deployment of the pilot dictionary, into a 4:1 ratio for pilot dictionary training and testing, and wherein the NLP unit, in subsequent iterations, is configured to establish a relationship with the stored electronic communications data based on 1-nth level of transitivity.

14. The system as claimed in claim 1, wherein the intelligent memory generation engine comprises an analytics unit configured to analyze the first and second tags to generate the multi-relational model, wherein the graph nodes of the multi-relational model are generated based on syntax and electronic communications data object stored in the sub-record storage unit, the graph node is generated such that a user node has a one-to-one with an electronic communications data node in the event a user is a sender, the electronic communications data node has a one-to-many relationship with many recipient user nodes, each electronic communications node has a one-to-one relationship with the electronic communications' body and header nodes, and has a one-to-many relationship with attachment nodes that are a part of that electronic communications data and the keyword nodes which are associated with the electronic communications data, and wherein the node embeddings are generated based on properties associated with nodes in the graph nodes.

15. The system as claimed in claim 14, wherein the analytics unit is configured to communicate with a Natural Language Processing (NLP) unit for receiving signals representing relevance of the keywords stored in the sub-record storage unit, and wherein the relevant keywords are used by the analytics unit for generating a querying model representing the conversation data associated with the electronic communications data for generating the multi-relational model.

16. The system as claimed in claim 14, wherein the analytics unit is configured to detect a state change of the data stored in the sub-record storage unit and verify a current state of the stored data prior to making a recommendation of changes to the information units.

17. The system as claimed in claim 14, wherein the analytics unit transmits the Recommendation Action Communication (RAC) via the recommendation unit, the recommendation unit is configured to communicate with the reporting database for generating and transmitting the Recommendation Action Communication (RAC), and wherein a recommendation tracking collection unit of the record storage unit is configured to track the time taken for the actions on the information units.

18. The system as claimed in claim 1, wherein the intelligent memory generation engine comprises a visualization unit configured to provide an actionable User Interface (UI) for administration of access control capabilities, to view and access searchable conversations based on keywords, and dashboards for viewing the conversation data associated with current users including inherited conversation threads of former users, keyword tagging data and graphical representations of analytics information.

19. A method for creating an intelligent memory and providing contextual intelligent recommendations, the method is carried out by a processor executing program instructions stored in a memory, the method comprises:
    extracting electronic communications data corresponding to multiple active users queued for extracting by a scheduler queue unit, wherein the extraction is performed based on at least a time zone associated with the user, the time zone preferred by the user or time zone set by an administrator for the user;
    performing a keyword tagging operation on the extracted electronic communications data, the keyword tagging operation comprising storing one or more keywords corresponding to one or more entities associated with the electronic communications data as a first tag in a record storage unit, and storing one or more keywords corresponding to conversation data associated with the extracted electronic communications data as a second tag in the record storage unit;
    generating a multi-relational model representative of the conversation data associated with the electronic communications data and other data stored in a sub-record storage unit of the record storage unit in the form of graph nodes based on the first tag and the second tag, the multi-relational model comprising node embeddings which are computed for unseen nodes representing unseen relationships between the extracted electronic communications data and the other data, wherein the node embeddings are computed by determining new relationships and undefined behaviour patterns between the extracted electronic communications data and the other data by identifying functions based on properties associated with neighbouring nodes in the graph nodes, the neighbouring nodes including nodes associated with predetermined users and former users who have left an organization or have been reassigned within the organization and are not a sender or receiver of the conversation data; and transmitting one or more electronic Recommendation Action Communication (RAC) with embedded application program interface calls based on the multi-relational model, the embedded application program interface calls enabling actions to be taken on information units via a single click, wherein a user specific briefing message is generated, by a recommendation unit by processing data stored in a reporting database for providing one or more intelligent recommendations, the briefing message is in the form of a Universal Resource Locator (URL) link, and wherein an Application Programming Interface (API) call is triggered, upon selection of the URL, which records a timestamp associated with the selected user specific briefing message and a subsequent API call is triggered to the information units by employing an authentication mechanism.

20. The method as claimed in claim 19, wherein the method comprises parsing the electronic communications data for removing a duplicate parsed header and subject from the extracted electronic communications data, a duplicate parsed body of the conversations data associated with the electronic communications data and duplicate attached documents based on a deduplication (DeDupe) check process; and capturing the electronic communications data in a custom format if a response to the electronic communications data is identified as having references to inline electronic communications data replies.

21. The method as claimed in claim 19, wherein in the event it is determined that a current state of the data in the sub-record storage unit is identical to a proposed change then the action taken on the information units is ignored, and wherein in the event it is determined that the current state of the data is incorrect then the recommended change is transmitted to the reporting database for storage and future retrieval.

22. The method as claimed in claim 19, wherein the method comprises providing 'view' authorization to the active users including existing or new users for viewing inherited conversation threads associated with electronic communications data of former users who have left the organization or have been reassigned.

* * * * *